US009714334B2

(12) United States Patent
Tabor et al.

(10) Patent No.: US 9,714,334 B2
(45) Date of Patent: *Jul. 25, 2017

(54) INTEGRATED PROCESS FOR TREATING RECYCLED PET AND PTT MATERIALS

(71) Applicant: Resinate Materials Group, Inc., Plymouth, MI (US)

(72) Inventors: Rick Tabor, Plymouth, MI (US); Shakti L. Mukerjee, Canton, MI (US); Kevin Rogers, Farmington, MI (US); Eric David Vrabel, Ferndale, MI (US); Adam W. Emerson, Ypsilanti, MI (US); Brian Douglas Phillips, Wilson, WY (US)

(73) Assignee: Resinate Materials Group, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,807

(22) Filed: Apr. 15, 2016

(65) Prior Publication Data

US 2016/0229982 A1 Aug. 11, 2016

Related U.S. Application Data

(63) Continuation of application No. PCT/US2016/015799, filed on Jan. 29, 2016.

(60) Provisional application No. 62/203,803, filed on Aug. 11, 2015, provisional application No. 62/110,372, filed on Jan. 30, 2015.

(51) Int. Cl.
*C08J 11/24* (2006.01)
*C08J 5/24* (2006.01)
*C08G 63/91* (2006.01)
*C08G 18/08* (2006.01)
*C08G 18/36* (2006.01)
*C08G 18/42* (2006.01)
*C08K 5/12* (2006.01)

(52) U.S. Cl.
CPC .......... *C08J 11/24* (2013.01); *C08G 18/0823* (2013.01); *C08G 18/36* (2013.01); *C08G 18/4288* (2013.01); *C08G 63/916* (2013.01); *C08J 5/24* (2013.01); *C08K 5/12* (2013.01); *C08J 2367/02* (2013.01); *C08J 2375/06* (2013.01); *C08J 2423/02* (2013.01); *Y02P 20/125* (2015.11)

(58) Field of Classification Search
CPC .... C08J 11/24; C08J 2375/06; C08J 2367/02; C08J 5/24; C08G 63/91; C08G 63/916; C08G 18/08; C08G 18/36; C08G 18/42
USPC .................................. 521/40–49.8
See application file for complete search history.

(56) References Cited

U.S. PATENT DOCUMENTS

| | | | |
|---|---|---|---|
| 2,793,220 A | 5/1957 | Barrett et al. |
| 3,647,759 A | 3/1972 | Walker |
| 4,355,175 A | 10/1982 | Pusztaszeri |
| 4,371,469 A | 2/1983 | Foglia et al. |
| 4,439,550 A | 3/1984 | Brennan |
| 4,542,239 A | 9/1985 | Lamparter et al. |
| 4,714,717 A | 12/1987 | Londrigan et al. |
| 4,720,571 A | 1/1988 | Trowell |
| 4,873,268 A | 10/1989 | Hallmark et al. |
| 5,068,395 A | 11/1991 | Bathe |
| 5,075,417 A | 12/1991 | Trowell et al. |
| 5,319,128 A | 6/1994 | DuPont et al. |
| 5,413,681 A | 5/1995 | Tustin et al. |
| 5,502,247 A | 3/1996 | Bartos et al. |
| 5,504,121 A | 4/1996 | West |
| 5,602,187 A | 2/1997 | West |
| 5,608,000 A | 3/1997 | Duan et al. |
| 5,612,467 A | 3/1997 | Weuthen et al. |
| 5,763,526 A | 6/1998 | Harakawa et al. |
| 5,763,692 A | 6/1998 | Kierkus et al. |
| 5,877,255 A | 3/1999 | Gerber et al. |

(Continued)

FOREIGN PATENT DOCUMENTS

| | | |
|---|---|---|
| CA | 2216772 | 4/1998 |
| CN | 1073164 A | 6/1993 |
| CN | 102061009 | 5/2011 |
| DE | 102014100607 | 7/2015 |
| EP | 1693409 | 8/2006 |

(Continued)

OTHER PUBLICATIONS

Machine translation of JP 2000-198876, Kajino et al, Nov. 2004.*
You et al., A New Era of Polyurethane Recycling—Fascia to Roof Rail: Sustainable Recycling in Automotive , Polyurethanes Expo (1999), pp. 377-382.
Viana et al. "Chemical Recycling of PET by Catalyzed Glycolysis: Kinetics of the Heterogeneous Reaction", Chem. Eng. Journ. 173 (2011) 210-219.

(Continued)

*Primary Examiner* — Frances Tischler
(74) *Attorney, Agent, or Firm* — Dilworth IP LLC

(57) ABSTRACT

A process for producing a polyester polyol comprising reacting a recycle stream selected from recycled PET carpet, carpet fiber, containers, textiles, articles or mixtures thereof, with a glycol in a reactor, thereby forming a digested product stream comprising polyols, and an undigested stream; and then reacting the digested product stream with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof.

11 Claims, 5 Drawing Sheets

(56) References Cited

U.S. PATENT DOCUMENTS

| | | |
|---|---|---|
| 5,922,474 A | 7/1999 | Kuo |
| 5,922,779 A | 7/1999 | Hickey |
| 5,968,992 A | 10/1999 | Naber et al. |
| 6,069,182 A | 5/2000 | Naber et al. |
| 6,262,294 B1 | 7/2001 | Sako et al. |
| 6,281,373 B1 | 8/2001 | Sato et al. |
| 6,339,125 B1 | 1/2002 | Bechara et al. |
| 6,429,233 B1 | 8/2002 | Oguri et al. |
| 6,433,121 B1 | 8/2002 | Petrovic et al. |
| 6,635,723 B1 | 10/2003 | Maier et al. |
| 6,642,350 B1 | 11/2003 | Asakawa et al. |
| 6,664,363 B1 | 12/2003 | Faunce |
| 6,750,260 B2 | 6/2004 | Sendijarevic |
| 6,867,322 B1 | 3/2005 | Kato et al. |
| 7,030,057 B2 | 4/2006 | Matsumoto |
| 7,045,573 B2 | 5/2006 | Mayer et al. |
| 7,192,988 B2 | 3/2007 | Smith et al. |
| 7,342,068 B2 | 3/2008 | Klingenberg et al. |
| 7,659,320 B2 | 2/2010 | Berard |
| 7,893,122 B2 | 2/2011 | Fregoso-Infante |
| 7,902,264 B2 | 3/2011 | Determan et al. |
| 8,692,013 B2 | 4/2014 | Tabor et al. |
| 8,784,514 B1 | 7/2014 | Graves, Jr. et al. |
| 8,864,057 B2 | 10/2014 | Bork et al. |
| 9,144,802 B2 | 9/2015 | Rees et al. |
| 2002/0184816 A1 | 12/2002 | Philipson |
| 2003/0225299 A1 | 12/2003 | Yazaki et al. |
| 2004/0102533 A1 | 5/2004 | Durand et al. |
| 2004/0127720 A1 | 7/2004 | Hedrick et al. |
| 2005/0288382 A1 | 12/2005 | Tuzson et al. |
| 2006/0252482 A1 | 11/2006 | Walker et al. |
| 2007/0219339 A1 | 9/2007 | Fregoso-Infante et al. |
| 2007/0225473 A1 | 9/2007 | Determan et al. |
| 2007/0293591 A1 | 12/2007 | Matsumura |
| 2007/0299150 A1 | 12/2007 | Nakao et al. |
| 2008/0194713 A1 | 8/2008 | Kim et al. |
| 2009/0131625 A1 | 5/2009 | Kurian et al. |
| 2009/0234034 A1 | 9/2009 | Blanco |
| 2010/0032618 A1 | 2/2010 | Mukai et al. |
| 2011/0039959 A1 | 2/2011 | Kim et al. |
| 2011/0257345 A1 | 10/2011 | Hoover, Jr. et al. |
| 2012/0136169 A1 | 5/2012 | Abraham et al. |
| 2012/0149791 A1 | 6/2012 | Felice et al. |
| 2014/0353870 A1 | 12/2014 | Roshau et al. |
| 2015/0182890 A1 | 7/2015 | Keyes et al. |

FOREIGN PATENT DOCUMENTS

| | | | |
|---|---|---|---|
| EP | 2565226 | | 3/2013 |
| ES | 2277554 | | 7/2007 |
| GB | 822834 | | 11/1959 |
| GB | 2041916 | | 9/1980 |
| GB | 610136 | | 10/1984 |
| GB | 2513100 | | 10/2014 |
| JP | 1995292223 | | 11/1995 |
| JP | 2000198876 | | 7/2000 |
| JP | 2000256274 | A | 9/2000 |
| JP | 2004161666 | | 6/2004 |
| JP | 2004238581 | | 8/2004 |
| JP | 2000-198876 | * | 11/2004 |
| JP | 2004307583 | A | 11/2004 |
| JP | 2005002161 | | 1/2005 |
| WO | 9919377 | | 4/1999 |
| WO | 2004005365 | | 1/2004 |
| WO | 2008085396 | A1 | 7/2008 |
| WO | 2008085397 | | 7/2008 |
| WO | 2009045926 | | 4/2009 |
| WO | 2011088437 | | 7/2011 |
| WO | 2012135625 | | 10/2012 |
| WO | 2013109834 | | 7/2013 |
| WO | 2013154874 | | 10/2013 |
| WO | 2014075057 | | 5/2014 |
| WO | 2015097104 | | 7/2015 |
| WO | 2015101960 | | 7/2015 |
| WO | 2015111071 | | 7/2015 |
| WO | 2015171433 | A1 | 11/2015 |

OTHER PUBLICATIONS

Frisch, "Progress in Recycling of Polyurethanes", Polimery (1998) 43, No. 10, 579-660.

Buggy et al. "Recovery of Polyol from Flexible Polyurethane Foam Wastes", Key Engineering Materials vols. 99-100 (1995) pp. 65-78.

Nagase et al., "Development of a Chemical Recycling Process for Waste Plastics Using Supercritical Water", Kobelco Technology Review No. 22, (Apr. 1999) 11-14.

Nikles et al., "New Motivation for the Depolymerization Products Derived from Poly(Ethylene Terephthalate) (PET) Waste: a Review", Macromol. Mater. Eng., (2005) 290, 13-30.

Bartecka, et al., "Polyols Obtained from Chemical Recycling of Integral Polyurethanes Waste Used for the Production of Urethane-rubber Composites", Modern Polymeric Materials for Environmental Applications, vol. 3, (2008), pp. 5-8.

Mazurek et al. "PET Wastes utilization in the synthesis of aliphatic-aromatic polyurethane elastomers", Polym. Adv. Technol., (2014) 25, 1273-1284.

Oku et al., "Chemical conversion of poly(carbonate) to bis(hydroxyethyl) ether of bisphenol A. An Approach to the ahemical recycling of plastic wastes as monomers", Polymer 41 (2000) 6749-6753.

Chun et al. "Characterization and Improvement of the Recyclate Obtained from the Glycolysis Reaction of Waste MDI Based Polyurethane Foam", Polyurethane Con. 2000, Oct. 8-11, 2000 537-541.

Nikje et al. "Polyurethane Waste Reducation and Recycling: From Bench to Pilot Scales", Designed Monomers and Polymers 14:5 (2011) 395-421.

Sendijarevic et al., "Chemical Recycling of Mixed Polyurethane Foam Stream Recovered from Shredder Residue into Polyurethane Polyols", Journal of Cellular Plastics, vol. 43 (Jan. 2007) 30-46.

Molero et al., "Chemical recovery of flexible polyurethane foam wastes", WIT Transactions on Ecology and the Environment, vol. 140, (2010) pp. 69-81.

Leaversuch, "Putting Polyesters in Focus; Thermoplastic Polyesters—It's a Good Time to Know Them Better"; Plastics Technology; Jun. 2004; pp. 46-64.

PCT International Search Report and Written Opinion dated Apr. 28, 2016 from corresponding Application No. PCT/US16/015799, 13 pages.

Molero et al., "Influence of the Use of Recycled Polyols Obtained by Glycolsysis on the Preparation and Physical Properties of Flexible Polyurethane", Journal of Applied Polymer Science, vol. 109 (2008) pp. 617-626.

European Commission Joint Research Centre "Survey of technologies for the recycling by chemolysis", (May 1996), IPTS, pp. 1-41.

Spec Sheet, "Flottweg Sorticanter—Innovative Centrifuge Technology for Plastics Recycling"; printed by Flottweg SeparationTechnology; May 2012; 8 pages.

Kim et al. "Kinetics of Polycarbonate Glycolysis in Ethylene Glycol", Ind. Eng. Chem. Res. (2009), 48, pp. 685-691.

Yin et al. "Oligomeric Isosorbide Esters as Alternative Renewable Resource Plasticizers for PVC", Journal of Applieced Polymer Science, (2011) vol. 119, No. 4, pp. 2400-2407.

Krauskopf "How About Alternatives to Phthalate Plasticizers?" Journal of Vinyl & Additive Technology, Dec. 2003, vol. 9 No. 4, pp. 159-171.

Collias et al. "Biobased Terephthalic Acid Technologies: A Literature Review"; Industrial Biotechnology vol. 10, No. 2 (2014) pp. 91-105.

Kelsey et al. "CycloShield (TM) Copolyesters: Greener, BPA-Free Alternative to Polycarbonate" Polymeric Materials: Science & Engineering (2010) 102, pp. 795-796.

Gezderi et al. "Recycling of Waste PET: Usage as Secondary Plasticizer for PVC"; Polymer-Plastics Technology and Engineering, 44 (2005) pp. 1379-1388.

(56) References Cited

OTHER PUBLICATIONS

Dutt et al. "Synthesis and characterization of poymeric plasticizers from PET waste and its applications in nitrile rubber and nitrile-PVC blend", Iran Polym J (2013) 22:481-491.
Kilinc et al. "Recycling of Waste PET: Usage as Secondary Plasticizer for PVC", Polymer-Plastics Tech. and Eng., 44: (2005) 1379-1388.
Drain, "Solvents for Polypropylene: Their Selection for a Recycling Process"; Conservation & Recycling, vol. 6, No. 3, pp. 107-122, 1983.
Vesely, "A New Method to Recycle PET bottles"; REWAS 2008, 5 pages.
Shukla, et al. "Chemical recycling of PET waste into hydrophobic textile dyestuffs"; Polymer Degradation and Stability 94 (2009) 604-609.
Li et al. "Recycling of Waste Poly (ethylene terephthalate) into Flame-Retardant Rigid Polyurethane Foams"; J. App. Polym Sci. 2014, vol. 1331, issue 19, pp. 40857-40862.
Konopa et al. "Emissions from Carpet Combustion in a Pilot-Scale Rotary Kiln: Comparison with Coal and Particle-Board Combustion"; J. Air & Waste Manage. Assoc. 58:1070-1076.
Spec for "Post-Consumer PET Bottle MODEL Bale"; Association of Postconsumer Plastic Recyclers; May 16, 2006.
Höcker et al., "Polymeric Materials as Biomaterials under Particular Consideration of Biodegradable Polymers", Macromolecular Symposia, 130 (1998), 161-168.
Kurihara; "Removal of Contaminations from Waster PET Bottles in Chemical Recycling"; No. 08-0546-74-748—(Dec. 2008) pp. 2642-2653.
Lemieux, "Emissions study of co-filing waste carpet in a rotary kiln", Journal of Environmental Management 70 (2004) 27-33.
Datye et al., "Poly(ethylene Terephthalate) Waste and Its Utilisation: A Review"; Resources and Conservation 11 (1984) 117-141.
Ramsden et al., "Factors Influencing the Kinetics of the Alkaline Depolymerisation of Poly(ethylene terephthalate). I: The Effect of Solvent"; J. Chem. Tech. Biotechnol., 1996, 67,131-136.
Khonakdar, et al. "A Review on Homopolymers, Blends, and Nanocomposites of Poly(trimethylene terephthalate) As a New Addition to the Aromatic Polyesters Class"; Iranian Polymer Journal 17 (1) 2008, 19-38.
Potiyaraj et al. "Physical Properties of Unsaturated Polyester Resin from Glycolyzed PET Fabrics"; Journal of Applied Polymers Science; vol. 104; 2536-2541 (2007).
ISOPA Fact Sheet, Recycling and Recovery Polyurethanes, Chemolysis, Jun. 2001.
Lin, Recycling Technology of PET Materials, Dec. 1998.
Molero et al. "Recovery of polyols from flexible polyurethane foam by "split-phase" glycolysis with new catalysts", Polymer Degradation and Stability 91 (2006) 894-901.
Simioni, et al. "Glycolysis of Flexible Polyurethane Foams", Cellular Polymers, 12(5), 337-348.
Wang et al. "Recycling of Carpet and Textile Fibers", Ch. 16, Plastics and the Environment: A Handbook, John Wiley & Sons, New York 2003, 697-725.
Zahedi et al. "Optimization of Phthalic/Maleic Anhydride-Endcapped PET Oligomers using Response Surface Method", Polymer Eng. & Science 2014, 417-429.
"Recycling Polyols back into Flexible Foam", Nov. 16, 2013, 3 pages.
Dynalene Report prepared for Resinate Material Group Laboratory, Jul. 1, 2014, pp. 1-30.
"Carpet", WARM Version 13, Jun. 2014, pp. 1-15.
Standish, "Willing and Label"; PRU, Aug. 2014, pp. 12-17.
Böhme, Synthesis and characterization of a novel unsaturated polyester based on poly (trimethylene terephthalate); Polymer 47 (2006) 1892-1898.
International Search Report mailed in PCT/US2015/045972 on Oct. 27, 2015, 3 pages.

* cited by examiner

INTEGRATED PROCESS FOR TREATING RECYCLED PET AND PTT MATERIALS

RELATED APPLICATIONS

This application is a continuation U.S. Application under 35 U.S.C. §365 of International Patent Application No. PCT/US16/15799, filed on Jan. 29, 2016, which claims priority to U.S. Provisional Patent Application Ser. No. 62/110,372 filed Jan. 30, 2015, and U.S. Provisional Patent Application Ser. No. 62/203,803 filed on Aug. 11, 2015, the disclosures of each of which are incorporated herein by reference in their entirety.

FIELD OF THE INVENTION

The invention relates to a process for producing polyester polyols and plasticizers from recycle PET & PTT streams. More particularly, the invention relates to an integrated process for producing polyester polyols by digestion of recycled PET or PTT carpet, carpet fiber, yarn; PET containers, textiles, string, twine or other recycled PET or PTT articles with glycol, and reaction of the digested material with a hydrophobe.

BACKGROUND OF THE INVENTION

The use of thermoplastic, polyester-based consumer products such as polyethylene terephthalate (PET) have become so widespread over the last few decades that they have become a fixture of modern day life. PET is used in carpet fibers, and primary and secondary carpet backings such as backing cushions. PET bottles have come to package virtually all common non-alcoholic drinks, spanning the range from water bottles to carbonated beverages to sports drinks. However, as a result of their popularity and the length of time required for the natural breakdown of the PET plastics, efforts have long been made to recycle the PET containing materials. Such recycling efforts have continued to be an important consumer consideration for several reasons. First, virgin PET is produced from petrochemicals, so that reducing the use of new bottles would lower oil consumption. Second, the recycling and reuse of recycled PET lowers emission of greenhouse gases as compared to the emissions that are generated from the extraction of oil, conversion of oil into PET intermediates, and the manufacture of final virgin PET product. Finally, recycling PET bottles or carpet and any of its components saves landfill space. Many landfills are closing, and permits for new landfills are very difficult, if not impossible, to obtain. Moreover, many high density population cities such as Seattle or New York, do not have landfill space, and consequently ship their daily waste via rail or barge, hundreds of miles to other states where landfill space is available. This space issue is a high-profile concern to modern consumers, states and municipalities, who have increasingly embraced the desirability of sustainable technologies. Indeed, such a sentiment has been demonstrated in related applications, where states such as California or cities such as New York have banned the use of plastic grocery bags or polystyrene cups. Recycling systems using a variety of mechanical or chemical processes for nylon and polypropylene-based carpet are known. However, over 95% of all PET carpeting is deposited in landfills. New and more flexible methods of recycling PET carpet components are needed to relieve the hundreds of millions of pounds of PET carpeting going into landfills today. There is thus a growing need for efficient processes to recycle PET carpet.

Current recycle methods for PET bottles typically involve the separation of colored and non-colored bottles from other recyclables and contaminants in the recycle stream. Caps, labels, adhesives and cap seals contained in the PET bottles are also removed prior to digestion in glycol, since they are made of polyolefins, not PET. Unfortunately, the purification of PET is a relatively complicated process. One manufacturer's process involves: (i) processing the bottles in a dry trommel machine to eliminate contaminants such as dirt or other particulates; (ii) treating the bottles with a magnetic field to eliminate ferromagnetic materials; (iii) washing to separate labels and adhesives from the bottles; (iv) processing the bottles through a second trommel machine to separate the PET from the labels and some of the lids; (v) auto-sorting the bottles using near-infrared detectors combined with pneumatic air streams to separate colored bottles from non-colored bottles; (vi) sorting the bottles manually to correct errors made by the near-infrared detection step; (vii) chopping the bottles into flakes; (viii) separating the polyolefin lids and seals from the higher density PET by floatation separation in water; (ix) washing the resulting PET flakes to further remove contaminants on formerly interior surfaces, labels and adhesive residues; (x) dewatering and drying to remove water; (xi) processing the flakes through a separator that removes aluminum contaminants; and optionally as a final step, (xii) melt processing the resulting flakes at high temperature in an extruder with filtering via a stainless steel screen pack to further reduce contaminants. It would be desirable to simplify this complicated process by reducing the number of steps involved, thereby making the entire process more cost effective, more environmentally friendly and more sustainable, since such streamlining would encourage even greater recycling rates throughout the world.

Following purification of the recycled PET material, a glycol digestion process may be used to convert the PET polymers to a mixture of glycols and low-molecular-weight PET oligomers. However, although such mixtures have desirably low viscosities (low molecular weight), they often have high hydroxyl numbers or high levels of free glycols.

Furthermore, digestion of recycled PET bottles without an initial separation of the polyolefin material has been disclosed, e.g., as in JP-2000-198876, JP-2004-238581 and JP-2005-002161), however, such methods can result in softened polyolefin material that agglomerates or clogs processing machinery, complicating its removal from the digested liquid.

Finally, although digested, recycled PET material can be reacted with various hydrophobic materials to increase its molecular weight, many of the conventional hydrophobes used yield solid, thick, or opaque products; polyols that have substantial particulates; or polyols that separate into two phases. However, this is unacceptable for urethane formulations, which require polyester polyols to meet specifications for color, clarity, hydroxyl number, functionality, acid number, viscosity, and other properties.

Therefore, improved processes for producing sustainable polyols from recycled PET for the urethane industry are needed that not only minimize processing difficulties and improve sustainability but provide polyester polyols having the desired properties. It has unexpectedly been found that producing polyester polyols and plasticizers from a recycle stream of PTT or PET carpet, carpet fibers, yarn; PET containers, textiles, twine, string, or other PET or PTT recycled articles in an integrated recycling process using particularly defined hydrophobes and modifiers, can provide the required specifications for polyurethane and polyisocyanurate applications.

SUMMARY OF THE INVENTION

The invention relates to processes for producing polyester polyols and plasticizers by an integrated process, where a recycle stream of PTT or PET carpet, carpet fibers, yarn; PET containers, textiles, string, twine or other recycled PET articles is reacted with glycol and hydrophobes.

In one embodiment, the present disclosure provides a process comprising first reacting a recycle stream selected from recycled PET carpet, recycled PET carpet fiber, recycled PET containers, recycled PET textiles, other recycled PET articles or mixtures thereof, with a glycol in a reactor, thereby forming a digested product stream comprising polyols, and at least one undigested stream. Then, the digested product stream is reacted in the reactor with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, thereby forming a polyester polyol.

In an alternate embodiment, the present disclosure provides a process comprising reacting: (i) a recycle stream selected from recycled PET carpet, recycled PET containers, recycled PET textiles, other recycled PET articles or mixtures thereof, (ii) a glycol; and (iii) a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, thereby forming a polyester polyol.

In still another alternative embodiment, the present disclosure provides a process comprising first reacting a recycle stream selected from recycled PET carpet, recycled PET carpet fiber, recycled PET textiles, bales of PET containers or mixtures thereof, with a glycol in a reactor, thereby forming a digested product stream comprising polyols, and at least one undigested stream. Then, the digested product stream in the reactor is reacted with a modifier selected from $C_3$-$C_8$ dicarboxylic acids, their mono or dialkyl esters, mono or dialkenyl esters, or anhydrides, thereby forming a polyester polyol.

In still another alternative embodiment, the present disclosure provides a process comprising reacting a recycle stream comprising bales of PET containers with a glycol in a reactor, thereby forming a digested product stream comprising polyols, and at least one undigested stream. Then the digested product stream is reacted in the reactor with at least one of a modifier selected from $C_3$-$C_8$ dicarboxylic acids, their mono or dialkyl esters, mono or dialkenyl esters, or anhydrides, and a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, thereby forming a polyester polyol.

In an alternate embodiment, the present disclosure provides a process comprising reacting: (i) a recycle stream selected from recycled PET carpet, recycled PET textiles, or mixtures thereof; (ii) a glycol; and (iii) a modifier selected from $C_3$-$C_8$ dicarboxylic acids, their mono or dialkyl esters, mono or dialkenyl esters, or anhydrides, thereby forming a polyester polyol.

In another alternate embodiment, the present disclosure provides a process comprising first reacting a recycle stream selected from recycled PET carpet, recycled PET containers, recycled PET textiles, other recycled PET articles or mixtures thereof, with a glycol in a reactor, thereby forming a digested product stream comprising polyols, and at least one undigested stream. Then, the digested product stream is reacted in the reactor with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof; and a modifier selected from $C_3$-$C_8$ dicarboxylic acids, their mono or dialkyl esters, mono or dialkenyl esters, or anhydrides, thereby forming a polyester polyol.

In still another alternate embodiment, the present disclosure provides a process comprising reacting: (i) a recycle stream selected from recycled PET carpet, recycled PET containers, recycled PET textiles, recycled PET articles, or mixtures thereof; (ii) a glycol; (iii) a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof; and (iv) a modifier selected from $C_3$-$C_8$ dicarboxylic acids, their mono or dialkyl esters, mono or dialkenyl esters, or anhydrides, thereby forming a polyester polyol.

In an alternate embodiment, the present disclosure provides a process comprising reacting a recycle stream selected from recycled PET carpet, recycled PET carpet fiber, recycled PET bottles, recycled PET textiles, other recycled PET articles, or mixtures thereof, with a glycol in a reactor, thereby forming a digested intermediate comprising polyols and contaminants selected from colorants, dyes, pigments, inorganic fillers, undigested polymers or mixtures thereof. Then the digested intermediate can be reacted with a polyisocyanate to form a product stream selected from polyurethane, polyisocyanurate or an isocyanate terminated prepolymer. The digested intermediate can also be reacted with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof to form a polyester polyol.

In another alternate embodiment, the present disclosure provides a process comprising reacting a recycle stream selected from recycled PET carpet, recycled PET bottles, recycled PET textiles, other recycled PET articles, or mixtures thereof, with a glycol in a reactor, thereby forming a digested intermediate comprising polyols and contaminants selected from colorants, dyes, pigments, inorganic fillers, undigested polymers or mixtures thereof. Then, the digested intermediate is reacted with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, thereby forming a polyester polyol.

In still another alternative embodiment, the present disclosure provides a process comprising reacting a recycle stream comprising bales of PET containers with a glycol in a reactor, thereby forming a digested product stream comprising polyols, and at least one undigested stream. Then the digested product stream is reacted in the reactor with a modifier selected from $C_3$-$C_8$ dicarboxylic acids, their mono or dialkyl esters, mono or dialkenyl esters, or anhydrides, thereby forming a polyester polyol.

In another alternate embodiment, the present disclosure provides a polyester polyol produced by a process comprising first reacting a recycle stream selected from recycled PET carpet, recycled PET containers, recycled PET textiles, other recycled PET articles or mixtures thereof, with a glycol in a reactor, thereby forming a digested product stream comprising polyols, and at least one undigested stream. Then, the digested product stream is reacted in the reactor with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, thereby forming a polyester polyol.

In an embodiment, the present disclosure provides a process comprising reacting recycled PET carpet fibers with a $C_4$ to $C_{36}$ mono alcohol to form a monomeric plasticizer.

In another alternate embodiment, the present disclosure provides a process comprising reacting recycled PTT carpet fibers with a $C_4$-$C_{36}$ mono alcohol to form a monomeric plasticizer.

In still another alternate embodiment, the present disclosure provides a process comprising reacting a glycol selected from 1,3-propanediol, 1,2-butylene glycol, 1,3-butylene glycol, 1,4-butanediol, 2-methyl-1,3-propanediol, pentaerythritol, neopentyl glycol, glycerol, trimethylolpropane, 2,2,4,4-tetramethyl-1,3-cyclobutanediol, 3-methyl-1,5-pentanediol, 1,4-cyclohexane-dimethanol, 1,3-cyclohexanedimethanol, 1,6-hexanediol, tripropylene glycol, tetraethylene glycol, polyethylene glycols having a number average molecular weight up to about 400 g/mol, block or random copolymers of ethylene oxide and propylene oxide, and mixtures thereof with a recycle stream comprising recycled PTT carpet, thereby forming a product stream.

In another alternate embodiment, the present disclosure provides a process comprising reacting a recycle stream comprising recycled PTT carpet with a $C_4$-$C_{36}$ alcohol to form a plasticizer.

In still another embodiment, the present disclosure provides a process comprising first densifying a PET or PTT fiber recycle stream into pellets or granules. Then the densified PET or PTT fiber recycle pellets or granules are reacted with a glycol in a reactor, thereby forming a digested product stream comprising a polyol product. Finally, the polyol product is filtered, thereby forming a filtered polyol product.

In another alternate embodiment, the present disclosure provides a process comprising first reacting a recycle stream comprising PET containers and densified PET or PTT-based carpet fibers in a reactor comprising a mixer, thereby forming a digested product stream comprising polyols. Then the digested product stream is reacted in the reactor with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, thereby forming a polyester polyol.

BRIEF DESCRIPTION OF THE DRAWINGS

The subject matter of the present disclosure will be more fully understood from the following detailed description, taken in connection with the accompanying drawings, in which.

DETAILED DESCRIPTION OF THE INVENTION

Figure 1:
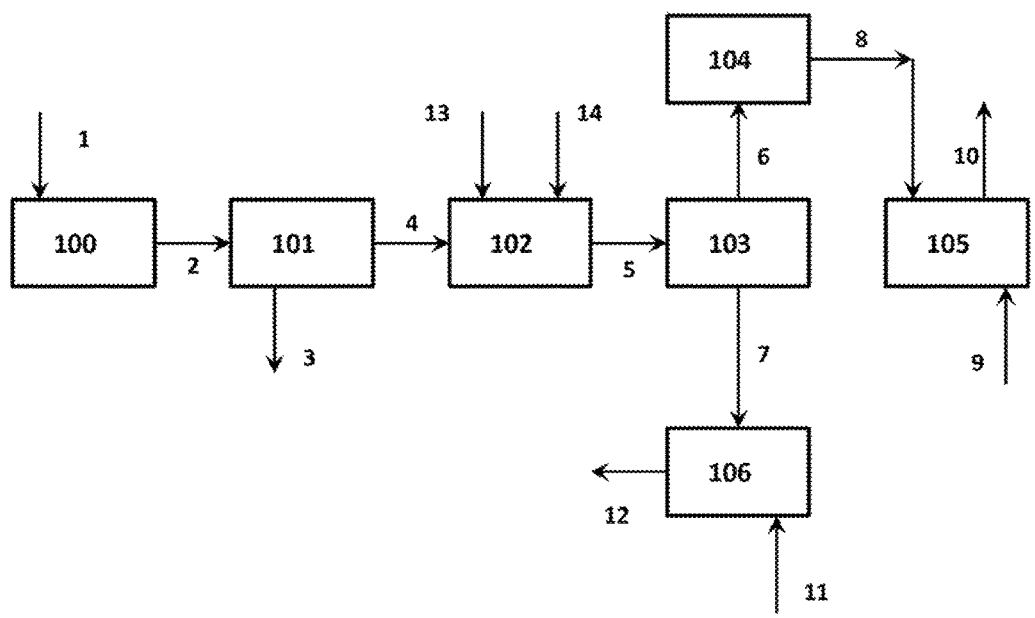
FIG. 1 illustrates a flow diagram of a process to produce polyester polyols from recycled PET bottles.

The inventive process produces polyester polyols using a recycle stream of PTT or PET carpet, carpet fibers, yarn; PET containers, textiles, string, twine or other recycled PET or PTT articles.

Recycle Stream

The recycle stream treated in the inventive process can include recycled PTT carpet, recycled PET carpet, recycled PTT carpet fiber, recycled PET carpet fiber, recycled PET yarn, recycled PTT yarn, recycled PET containers, recycled PET textiles, recycled PET twine or string, other recycled PET articles, or mixtures thereof. In each case, the recycled PET or PTT carpet, carpet fiber, yarn; PET containers, textiles, twine or string, or other recycled PET articles are post-industrial or post-consumer materials. Preferably the recycled PET containers are PET bottles.

PET Bottles

When the recycle stream is PET bottles, the bottles typically originate from recycling centers where the recycled bottles are compressed into bottle bales that are typically held in place by baling wire, and are mounted on pallets for transportation. Periodically, pieces of wire can break off and become attached to the bale of bottles, thereby becoming part of the recycle stream. Whole bottles are included in the bottle bales and are processed in the inventive process. This includes caps, liner and ring, the label on the bottle, the ink used to print information and graphics on the label, as well as the adhesive that fastens the labels to the bottle. Caps are typically manufactured from polyolefins such as polypropylene and polyethylene. The polyethylene is typically high density polyethylene (HDPE). The liner and ring are typically manufactured from EVA, polyamide resin, or ethylene-propylene diene monomer (EPDM). Labels are typically produced from polypropylene, a polyamide resin or PET. The adhesive is typically a hot melt adhesive or a pressure sensitive adhesive having a broad range of compositions. In one embodiment, the polyvinyl chloride (PVC) content of the recycle stream is less than 10,000 ppm based on the total weight of the recycle stream. Alternately, the PVC content is less than 1000 ppm or less than 500 ppm based on the total weight of the recycle stream, or the recycle stream can be essentially free of PVC, where for the purposes of this specification, the term essentially free with regard to PVC in the recycle stream means less than 100 ppm PVC based on the total weight of the recycle stream.

Preferably, the recycle stream contains from 83.0 to 91.5 wt % PET, present as recycled PET bottles, 7.5 to 13.5 wt % polyolefins, 1.0 to 3.0 wt % of an adhesives stream containing the adhesive material, polyamides and EPDM, and 0 to 0.5 wt % metals. Alternately, the recycle stream contains 84.0 to 90.0 wt % PET, 8.4 to 13.2 wt % polyolefins, 1.5 to 2.5 wt % adhesive stream and 0.1 to 0.3 wt % metals.

Recycled PET & PTT Carpet

The recycle stream can include either a whole carpet stream or carpet fiber stream produced from PET or PTT. The whole carpet stream includes the carpet fibers and contaminants such as the polyolefin-based backing, and adhesives such as rubber latex, SBR latex, carboxylated SBR latex, EVA emulsions, PVA emulsions and starches. SBR latex also typically includes additives such as calcium carbonate extenders, surfactant frothing agents, and polyacrylate thickeners. The carpet fiber stream includes face fibers from the recycled carpet, and is typically composed of staple fibers or bulk continuous filament (BCF) fibers that have been removed from the whole carpet stream. Both the whole carpet and carpet fiber can further contain more contaminants such as dirt, pet hair, mold and the like, than a post-industrial recycle carpet stream, and may require a washing step in conventional recycling schemes prior to use as a recycled PET or PTT stream.

When the recycle stream is PET or PTT carpet, the fibers typically originate as post-industrial off-grade, surplus or defective recycle carpet, greige goods, or fiber products and post-consumer recycle carpet. In the case of post-consumer recycled carpet, the carpet is typically collected by carpet installers for use as a recycle stream.

Recycled Polyurethane Flexible Foam

The recycled PET & PTT carpet stream may further contain recycled flexible polyurethane foam. Recycled polyurethane foam may be obtained from post industrial or post consumer recycled carpet underlay. This carpet underlay may be rebond polyurethane flexible foam or polyurethane rebond foam cut into sheets of various thickness from polyurethane slabstock foam of various densities. Rebond polyurethane flexible foam is produced by adhering chunks of polyurethane flexible foam together using an isocyanate prepolymer. The resulting rebond flexible polyurethane foam can have higher durability than a simple polyurethane slabstock foam as a carpet underlay. Further, during the removal of PET or PTT carpet, the flexible polyurethane foam carpet cushion or underlay is frequently also removed. This polyurethane foam may be co-digested with PET & PTT by reacting the flexible polyurethane foam and the PET or PTT with glycol in a reactor with a mixer to form a digested product stream comprising polyol, as described above. The PET or PTT stream is selected from recycled PET or PTT-based carpet fibers, recycled PET bottle bale material, recycled PET or PTT fabric or fibers, or mixtures thereof. When PET or PTT-based carpet fibers are present, they have preferably been densified. The co-digestion of the polyurethane foam and PET or PTT with glycol produces a polyester polyol. Another source of recycled polyurethane flexible foam includes post-industrial scrap polyurethane molded foam produced unintentionally during the production of automotive seat cushions. Scrap flexible polyurethane foam resulting from the production of furniture and mattresses represents another possible source of recyclable polyurethane foam suitable for the practice of the novel process described herein. Finally, another source of flexible polyurethane foam includes scrap foam produced during the production of flexible slabstock foam.

Recycled PET & PTT Twine or String

When the recycle stream is recycled PET or PTT twine or string, post industrial sources include the twine or string typically originating from leftover or off-grade twine or string resulting from the production of original twine or string. An additional post-industrial source of string includes excess or waste streams from manufacturers of nets and ropes.

Other PET or PTT Recycled Articles

Other PET or PTT containing materials that can be recycled in the process of the present disclosure include recycled geotextiles, recycled fillings, such as toys, pillows, sofa and furniture cushioning, automotive fabric, wadding, and filtration media. Geotextiles are permeable textile material used to increase soil stability, provide erosion control or aid in drainage. They are typically used in constructing roads, pools and other construction projects. Fabric produced from polyester staple fiber is used throughout the automotive industry in its fabrics because of its effectiveness and long life. Polyester staple fiber is also used in the wadding industry as a blend with bi-component low melt fibers. Non woven fabrics are used for air filtration, water filtration and oil filtration sectors.

Treatment of Recycled PET or PTT Carpet

The recycled PET or PTT carpet can be processed in a series of steps prior to digestion. When the whole carpet is to be digested, the carpet can be subjected to a size reduction step, where it is first cut, shredded or milled into pieces of reduced size suitable for the reactor used. Alternately, the carpet can be processed in conventional or water-based size reduction systems. Such conventional size reduction systems include, for example, a series of mechanical step(s) to reduce the size of the particles, including combinations of shredding and milling step(s). An example of such a milling step is the use of a hammer mill. When the carpet fiber is to be digested, the whole carpet must be subjected to a separation step where the carpet fibers are separated from the carpet backing components of the whole carpet in a series of mechanical steps. These steps can include the size reduction systems described above, if required, followed by separation step(s) conducted in water or air using differences in density; e.g., with an air separator, centrifuge or other specific gravity-based air or aqueous systems. Shaving, shearing or skiving can also be used to separate the carpet fibers from the carpet backing. Following mechanical processing and separation, the processed stream may be treated in further steps including washing, drying, and densification.

In one embodiment, the carpet components left over after separation from the fiber are then processed in a kiln, incinerator or gasifier to combust the carpet backing to produce a combustion gas stream comprising carbon dioxide and acid gases, and a combusted solid streams containing calcium carbonate, calcium oxide (quick lime), or calcium hydroxide (slaked lime) or mixtures thereof. Fuels to such combustion systems include conventional, i.e., fossil-fuel based fuels, or bio-based fuels, such as wood, lignin, biodiesel, biobased butanol, biobased ethanol, or agricultural wastes. Other waste materials, such as municipal waste can be combusted with the carpet backing. The combustion process is typically utilized as one part of a power generation process where the heat of combustion of the carpet backing is captured as steam produced in a boiler. The steam can then be converted to electricity in a steam turbine.

Washing

The separated, recycled PET or PTT carpet fibers can then be washed in one or more steps to remove contaminants such as dirt, hair and mold. Such methods include conventional techniques, e.g., slurrying the fibers with a wash solution, optionally with agitation, followed by decanting and/or filtering the wash solution from the PET fibers. Filtration of the wash solution can be conducted using any conventional equipment, such as centrifugal filters, pressure filters or gravity filters.

Drying

The washed PET or PTT carpet fibers can then be dried in one or more steps to reduce the moisture content. Drying equipment that can be used for the drying step include rotary dryers, drum dryers, belt dryers, vacuum dryers, bin dryers, tray dryers, tray dryers, fluidized bed dryers, and trough dryers.

Densification

The main purpose for densification of the dried PET or PTT carpet fibers, as well as other fiber-based recycle stream such as yarn, twine or string, is to increase the bulk density of the resulting polymer such that the material may be conveniently fed into the reactor and also fits into the reactor much more efficiently. This allows the PET or PTT material to be efficiently wetted by co-reactants that are introduced into the reactor, thereby minimizing processing time. One method for densifying the dried PET or PTT carpet fibers includes feeding the fibers, for example, via an auger or screw feeder, into either a twin screw extruder or a single screw extruder to melt the fibers and subsequently pelletize them. Conventional extrusion equipment can be used to perform such a densification. Another method for densifying the dried PET or PTT carpet fibers includes a friction densification system that utilizes a rotor and stator to soften the fibers to a point as to make long agglomerated strands which are subsequently fed into a granulator to produce densified granules. Various types of agglomeration processes exist today. Two such examples are Herbold Meckesheim USA and Pallman Industries.

Still another method for densifying the dried PET or PTT carpet fibers includes simply heating the fibers to melt them, for example, by conveying the carpet fibers through an oven or other heat source using a conveyor belt. The melted fibers shrink and adhere to one another, thus yielding an increased bulk density feedstock that may then be granulated or comminuted. This method avoids the need for relatively expensive pelletization and extrusion equipment.

Yet another method for densifying the dried PET or PTT fibers is via the introduction of the fibers into an agglomerator or densifier apparatus. An agglomerator or densifier is essentially a large drum where several blades spin at high speed near the bottom of the drum the bottom of the drum, thereby creating friction until the material reaches its softening point and densifies. The operator then adds water to cool the batch down, and after the water evaporates, a discharge door is opened, releasing material that is frequently called PET or PTT popcorn or granules. This type of agglomeration is typically referred to as "Tub Densification."

The bulk densities of the densified recycle PET material typically ranges from 200 to 1,000 g/L as measured by determining the weight and volume of a given quantity of densified material and dividing the resulting weight measured by the resulting volume measured. Preferably, the densified bulk densities can range from 400 to 1,000 g/L, more preferably, 600 to 1,000 g/L. Bulk densities for other non-densified materials include recycled PET flakes of 250 to 450 g/L and recycled PET pellets of 750 to 950 g/L.

The fiber recycle stream can be obtained by the recycling processes described above from post-industrial or post-consumer carpet backing prior to densification. The fiber recycle stream can also be obtained by cutting the fiber from industrial rolls prior to densification. Finally, the fiber recycle stream can be obtained by separation of the fibers from industrial rolls by aspiration. The fiber recycle stream can also can be washed and dried to remove contaminants prior to densification. Preferably, the fiber recycle stream yields a polyol product having a viscosity at 80° C. of less than 20,000 cP.

Recycled PET and Fabric or Textile

When the recycle stream is PET textile or fabric, the material typically originates as post-industrial off-grade or scrap, and can contain pigments, dyes and other contaminants. About 65-70 percent of global polyester production is used for textiles, of which more than 65 percent is produced in China. The majority of the remaining 30-35 percent is used in the manufacture of PET beverage bottles. Post-industrial off-grade fabric or textiles might originate from incorrectly dyed fabric or incorrectly woven textiles. Post-industrial scrap can originate from leftover fabric that results from cutting fabric during the manufacture of clothing, furniture, fabrics, shoes, curtains, and other articles that use PET. Post-consumer recycling of PET fabrics or textiles can occur by utilizing worn-out polyester clothing from apparel and uniform manufacturers and retailers as well as government agencies, hospitals and clinics, schools, sports clubs, and other entities.

Recycled PET Yarn

When the recycle stream is PET yarn, the material typically originates as post-industrial off-grade or scrap, and can contain pigments, dyes and other contaminants. The recycled PET yarn can be present as material wound about tubes or cones, some of which can be made from cardboard or plastic. Post-industrial off-grade or scrap might originate from carpet manufacturing when a run of a particular carpet is completed, and partially used cones or tubes with relatively small amounts of yarn remaining on the rolls, make it inefficient to begin another carpet run with such a small amount of yarn on the cones or tubes. Such scrap may also result from off-grade yarn lots. The recycled PET yarn stream can first be processed by separating the yarn from the cardboard/paper or plastic tubes or cones. Examples of equipment capable of performing this operation include guillotines, roll splitters, reel splitters and updrafts. The separated cardboard/paper tubes or cones can be reused, recycled as paper, or burned as fuel in an incinerator. The plastic cones or tubes are reusable by the manufacturer. The separated yarn can be processed by densification as described above for PET yarn, carpet fibers, twine, string, fabric or textile. If extruded in the melted state, the PET yarn can be filtered to remove undesirable solid particles prior to pelletization to form pellets that can be processed in the digestion reactors.

The carpet backing resulting from separating the PET or PTT carpet fibers from the whole carpet may be recycled into molded thermoplastic parts or incinerated for fuel value. The polyols resulting from the digestion process of the carpet fibers may be filtered, treated with filtration media such as celite or activated carbon to remove undigested particulates or color.

Mixed Recycle Streams

The recycle stream fed to the digestion reactor can be a mixture of PET-containing or PTT-containing recycle substreams selected from carpet fibers, carpet, yarn; PET containers, textiles, twine or string. When the digestion reactor processes a mixture of PET or PTT-containing sub-streams, the reactor is equipped with a high speed, high shear mixer as discussed below. This is necessary to ensure breaking up the various PET or PTT-containing solids. The mixed recycle stream can alternately contain polyethylene terephthalate or polytrimethylene terephthalate and polyurethane flexible foam. These can be mixed and reacted in a reactor with glycol in a process as described above to form a polyol. Preferably, the mixed recycle stream is selected from recycled PET or PTT-based carpet fibers, recycled PET bottle bale material, recycled PET bottles, recycled PET or PTT fabric or carpet fibers, or mixtures thereof. The mixed recycle stream can also preferably contain PET bottle bale material and densified mixtures of PET carpet fiber, PTT carpet fiber or mixtures thereof. These can be mixed and reacted in a reactor with glycol in a process as described above to form a polyol.

Glycols

Glycols suitable for use are well known. By "glycol," is meant a linear or branched, aliphatic or cycloaliphatic compound or mixture of compounds having two or more hydroxyl groups. Other functionalities, particularly ether or ester groups, may be present in the glycol. In preferred glycols, two of the hydroxyl groups are separated by from 2 to 10 carbons, preferably 2 to 5 carbons. Suitable glycols include, for example, ethylene glycol, propylene glycol, 1,3-propanediol, 1,2-butylene glycol, 1,3-butylene glycol, 1,4-butanediol, 2-methyl-1,3-propanediol, erythritol, pentaerythritol, neopentyl glycol, glycerol, trimethylolpropane, 2,2,4,4-tetramethyl-1,3-cyclobutanediol, 3-methyl-1,5-pentanediol, 1,4-cyclohexane-dimethanol, 1,3-cyclohexanedimethanol, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and the like, and mixtures thereof. Preferably, the glycol is selected from propylene glycol, 2-methyl-1,3-propanediol, 3-methyl-1,5-pentanediol, neopentyl glycol, diethylene glycol, polyethylene glycol having a number average molecular weight of about 200, and mixtures thereof. Propylene glycol is particularly preferred. In a preferred embodiment, the glycol is a recycled glycol, especially recycled propylene glycol and recycled diethylene glycol. Propylene glycol recovered from used deicing fluids is one example. In another preferred embodiment, the glycol is a recycled ethylene glycol, which may be recovered from used engine antifreeze or coolant.

Hydrophobes

The polyols in the digested material are reacted with hydrophobes so that the polyols can incorporate recurring units from at least one of the hydrophobes. The polyols in the digested material can be reacted with the hydrophobe either before or after the undigested contaminants have been separated from the polyols. The hydrophobes are reacted in the reactor in an amount within the range of 0.1 to 3.0, preferably 0.1 to 1.0 moles of hydrophobe per mole of recycled PET bottle. Alternately, the hydrophobe is reacted in an amount within the range of 0.15 to 0.8 moles of hydrophobe per mole of recycled PET bottle.

Suitable hydrophobes for use in the inventive processes are selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof.

Preferably, the hydrophobe is selected from dimer fatty acids, ricinoleic acid, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols; cardanol-based products, recycled cooking oil, hydroxy-functional materials derived from epoxidized, ozonized, or hydroformylated fatty esters or acids, or mixtures thereof. More preferably, the hydrophobe is selected from dimer fatty acids, ricinoleic acid, corn oil, canola oil, soybean oil, castor oil, triglycerides or alkyl carboxylate esters having saturated or unsaturated $C_8$-$C_{20}$ fatty acid units, saturated or unsaturated $C_8$-$C_{20}$ fatty acids, alkoxylated castor oil, saturated or unsaturated $C_9$-$C_{18}$ dicarboxylic acids, cardanol-based products, hydroxy-functional materials derived from epoxidized, ozonized, or hydroformylated fatty esters or acids, or mixtures thereof.

Modifiers

Modifiers can also be included in the inventive process, to increase the molecular weight of the polyols in the digested material without overly increasing the viscosity. The polyols in the digested material can be reacted with the modifier either before or after the undigested contaminants have been separated from the digested material. They can also be used with or without the hydrophobes as described above, and are selected from $C_3$-$C_8$ dicarboxylic acids, their mono or dialkyl esters, mono or dialkenyl esters, diesters, or anhydrides. Preferably, the modifier is selected from alkyl ester, anhydride or free acid derivatives of glutaric acid, adipic acid, succinic acid, malonic acid cyclohexane dicarboxylic acids, maleic acid, fumaric acid, itaconic acid, phthalic acid, 2,5-furandicarboxylic acid, isophthalic acid, or mixtures thereof. More preferably, the modifier is selected from alkyl ester, anhydride or free acid derivatives of adipic acid, maleic acid, succinic acid, itaconic acid, phthalic acid, isophthalic acid, and 2,5-furandicarboxylic acid. When used with hydrophobes, the modifiers can be reacted simultaneously with the hydrophobe or sequentially in multiple steps before or after the hydrophobe.

Polyisocyanates

Polyisocyanates suitable for use in the inventive process include aromatic, aliphatic, cycloaliphatic polyisocyanates, and trimer derivatives thereof, prepolymers thereof, carbodiimide derivatives thereof, blocked derivatives thereof and blends thereof. Examples include toluene diisocyanates (TDIs), methylene bisphenyl diisocyanates (MDIs), polymeric MDIs, naphthalene diisocyanates (NDIs), hydrogenated MDIs, trimethyl- or tetramethylhexamethylene diisocyanates (TMDIs), hexamethylene diisocyanate (HDI), hexamethylene diisocyanate trimer, isophorone diisocyanates (IPDIs), isophorone diisocyanate trimer, cyclohexane diisocyanates (CHDIs), xylene diisocyanates (XDI), hydrogenated XDIs, and the like. Aliphatic diisocyanates, such as hexamethylene diisocyanate and isophorone diisocyanates are particularly preferred. The polyisocyanates can be reacted with the polyester polyol either before or after the undigested contaminants have been separated from the polyester polyol. The polyisocyanates can also be reacted with the digested polyols, independently of whether the digested polyols have or will be reacted with hydrophobes or modifiers.

Digestion Reaction

When the recycle stream is PET bottles, the recycled PET bottles, polyolefins, and contaminants from the recycle stream and glycol are placed in a reactor. The contaminants can include unfinished soft drink residues, food residues such as mustard and ketchup, paper labels, aluminum, dirt, oddly colored PET, broken glass, wood, adhesives, seal materials, ferromagnetic particles, polyvinyl chloride, pigmented and crystallized PET (C-PET), un-separated trash, non-PET recycle streams, polystyrene, glycol-modified PET (PETG). Multilayer PET containers may also include ethylene/vinyl alcohol (EVOH) copolymers, interlayer thermoplastic adhesives, metallized labels, and extrusion-blown PET (E-PET) containers. Other PET or PTT recycle streams or mixtures of streams can be placed in the reactor, including carpet, carpet fiber, textile, yarns, twine, string, as described above. When mixtures of the recycle streams are used, preferably, the mixtures contain PET containers and carpet or carpet fiber, whether PET or PTT based. The mixture can alternately contain PET bottle bale material, and PET or PTT carpet fiber (or mixtures thereof). These mixtures can be reacted with glycol in a reactor with a mixer, as discussed above, to form a digested product stream comprising a polyol. Unless otherwise specified, reactor conditions, glycol usage, catalyst, and equipment used in the digestion of mixed streams is as discussed in the general procedure below.

Reactor

The reactor can generally be any closed or closeable vessel suitable for holding, mixing and reacting the reactor contents at the temperatures and pressures of the reaction. The materials of construction for the reactor may also be any consistent with the reactants and reactor products from a chemical compatibility standpoint, as well as from a temperature/pressure standpoint. For example, the reactor may be constructed from carbon steel, stainless steel, Inconel, Hasteloy, and Monel. The reactor is typically a cylindrical vessel, oriented either horizontally or vertically, with flat or dished heads. When dished heads are used, they can be ellipsoidal, torispherical, hemispherical or conical. The reactor is typically equipped with sufficient nozzles to allow injection of liquid reactants, draining of reactor products or cleaning, e.g., nozzles to allow steam cleaning. The reactor preferably has a discharge valve. Preferably, the discharge valve has maximum clearance when the valve is open, e.g., a ball valve. Preferably, the reactor is equipped with heating/cooling means that can include external jacketing or internal coils. The heating/cooling media can include conventional fluids such as steam, oil and water. Preferably, the discharge valve is jacketed to allow heating and cooling.

The reactor can be operated in configurations designed to disperse the undigested polyolefin phase or to allow the undigested material to agglomerate. When it is desired to disperse the undigested polyolefin phase, or alternately, when mixtures of recycle streams are used in the digestion reactor, e.g., PET containers and densified carpet fibers, the reactor is typically equipped with at least one mixer having a motor, rotating shaft and an impeller. Preferably, the mixer is equipped with at least one high speed, high shear impeller for breaking up and dispersing solid and semi-solid pieces of the PET bottles, as well as for dispersing undigested materials such as polyolefins in the volume of glycol and digested material. The mixer can contain one or more shafts to optimize the breakup, dispersion and mixing of solids in the reactor contents. Preferably, the mixer contains one, two or three shafts. Preferably, the mixers employ open-disk impellers, closed rotating rotor-stators, a rotor-stator with revolving stator, or a fixed rotor and stator. The tip speed of the at least one high speed, high shear impeller is preferably 40 to 120 feet per second, more preferably 60 to 100 feet per second. Low speed mixing and/or low shear impellers present as the sole impeller, are not suitable for dispersion since they are merely designed to prevent solids sedimentation in the vessel or to blend materials. The polyolefin material present in the reactor does not digest, but softens. Without high levels of shear the softened polyolefin mass does not disperse, potentially presenting difficult separation problems, requiring shutdown and manual cleaning. The softened polyolefin mass can also wrap around and/or stick-to the agitator shaft, which also presents a difficult operational problem.

In certain embodiments of the invention, it is preferable to allow the non-digested polyolefin phase to accumulate into a large mass, adhering to and collecting non-digested contaminants within the mass, separating the liquid polyol from the polyolefin and non-digested contaminants. In this case, low-speed, load sheer mixing equipment is typically used. These can be present in addition to, or instead of the high shear mixer present in the reactor, as described above. The polyolefin phase containing non-digested contaminants can then be recycled into other applications such as artificial wood. Surprisingly, small amounts of adhesives such as ethylene/acrylic acid copolymers or ethylene/methacrylic acid copolymers can be added to the reaction mixture, where it resides in the non-digested polyolefin phase, enhancing the ability of this phase to both agglomerate into a large mass, and to collect and adhere to non-digested contaminants, thereby facilitating their separation from the polyol phase by decanting. It is believed that numerous other non-digesting adhesive materials can be added to the reaction to provide this agglomeration effect, such as polyvinyl acetate, polyvinyl alcohol, polyvinyl butyric, polyvinyl formal, polyvinyl ether, acrylic polymers, polychloroprene, styrene-butadiene copolymers, styrene-diene-styrene copolymers, polyisobutylene, acrylonitrile-butadiene, polyurethane thermoplastics, co- and ter-polymers of ethylene with vinyl acetate, ethyl acrylate, butyl acrylate, methyl acrylate, acrylic acid and combinations thereof.

The ethylene/acrylic acid or ethylene methacrylic acid co- or terpolymers preferably include between 3 and 50 wt. % (meth)acrylic acid comonomer by weight, and may include other ter-monomers such as alkyl (meth)acrylates, vinyl acetate, maleic anhydride, maleic acid, alkyl esters of maleic acid, free-radically polymerizable comonomers, and mixtures thereof. Further, the ethylene/acrylic acid or ethylene methacrylic acid co or terpolymers as described above may be partially or completely neutralized as metal salts to form ionomers. Examples of such ionomer products include DuPont Surlyn™ products, DuPont Elvaloy™ products and Dow Chemical Amplify™ products.

Emulsifiers

An emulsifier can optionally be used to aid in the dispersion of the polyolefin material. Such an emulsifier typically contains an anhydride-, epoxide-, carboxylic acid- or ester-containing polymer or a mixture thereof. Preferably, the emulsifier is selected from styrene/maleic anhydride copolymers, ethylene/acrylic acid copolymers or terpolymers, ethylene/methacrylic acid copolymers or terpolymers, metal salts of ethylene acrylic acid copolymers or terpolymers, metal salts of ethylene/methacrylic acid copolymers or terpolymers, ethylene/alkyl acrylate copolymers or terpolymers, ethylene/glycidyl acrylate copolymers or terpolymers, or ethylene/glycidyl methacrylate copolymers or terpolymers. Preferably, the metal of the metal salts of ethylene/(meth)acrylic acid copolymers or terpolymers is selected from zinc or sodium.

In the digestion, the recycle stream and glycol are heated within the range of 80° C. to 260° C., alternately 100° C. to 250° C., 130° C. to 240° C., or 160° C. to 230° C., optionally in the presence of a catalyst, to form a digested stream and a non-digested stream. Typically, the reaction is run at atmospheric pressure, although the reaction can be run at pressures between about 0 psia to about 100 psia, about 5 psia to about 75 psia, or about 7 psia to about 65 psia. In those instances where it is desirable to remove water, reduced pressures below 1 atmosphere can be useful. The digested stream comprises glycol, bis(hydroxyalkyl)terephthalates, and oligomers thereof. Undigested material includes polyolefins, dyes, inorganic fillers and other contaminants.

Catalyst

A catalyst can be used in the digestion reaction. In particular, suitable catalysts comprise tin, titanium, zinc, antimony, germanium, zirconium, or manganese. Specific examples include titanium alkoxides (e.g., tetrabutyl titanate or tetraisopropyl titanate), titanium(IV) phosphate, titanium (IV) tetrabutoxide, titanium (IV) tetrapropoxide, zirconium alkoxides, zinc acetate, manganese(II) acetate, antimony trioxide, germanium oxide, or the like, and mixtures thereof. Catalysts that do not significantly promote isocyanate reaction chemistries are preferred. Preferably, the catalyst is butyltin hydroxide oxide hydrate or a titanium alkoxide such as titanium t-butoxide. The amount of catalyst used is typically in the range of 0.005 to 2 wt. %, based on the total amount of polyol being prepared. Alternately, the amount of catalyst used is in the range of 0.01 to 1 wt. %, 0.02 to 0.7 wt. %, or 0.05 to 0.2 wt. %, based on the total amount of polyol being prepared.

Usually, the digestion reaction is performed by heating the recycled material, e.g., PTT or PET carpet, carpet fibers, yarn; PET containers, textiles, string, twine or other recycled PET or PTT articles; glycol(s); and any catalyst at least until the mixture liquefies and particles of the PET are no longer apparent. Reaction times range from about 30 minutes to about 16 hours, more typically 1 to 10 hours, even more typically 3 to 8 hours, depending on the reaction temperature, source of the PET or PTT, the particular glycol reactant used, mixing rate, desired degree of depolymerization, and other factors that are within the skilled person's discretion.

The molar ratio of glycol to PET (or PTT) from the recycle stream is at least 0.8, preferably 1.0 to 6.0, more preferably 2.5 to 4.5. When the glycol/PET (or PTT) molar ratio is below 0.8, the hydrophobe-modified polyester products are often too hard to be digested. On the other hand, when the glycol/PET (or PTT) molar ratio is greater than about 6, the hydroxyl numbers tend to exceed the practical upper limit of about 800 mg KOH/g.

The digested material can be reacted in a further step with one of the particular hydrophobes described above to give a polyester polyol. The reaction between the digested stream and the hydrophobe is performed under conditions effective to promote one or more of several different possible reactions between the digested intermediate and the hydrophobe, principally condensation reactions. For instance, hydroxyl groups in the digested intermediate can react with acid or ester groups in the hydrophobe to generate esters from the acids or new esters from the original ones. Because the hydrophobes often have hydroxyl functionality as well, new esters can be formed that utilize that hydroxyl functionality. Other kinds of reactions may occur, including crosslinking or cycloaddition reactions involving carbon-carbon double bonds and/or allylic hydrogens that were originally present in the hydrophobe.

Reactions between the digested stream and hydrophobe are typically performed by heating at temperatures within the range of 80° C. to 260° C. Alternately, the temperature range is 90° C. to 230° C., 100° C. to 220° C. or 110° C. to 210° C. Typically, the reaction is run at atmospheric pressure, although the reaction can be run at pressures between about 0 psia to about 100 psia, about 5 psia to about 75 psia, and about 7 psia to about 65 psia. When it is desirable to remove water, the reactor is preferably operated under vacuum, e.g., 0 psia to less than 14.7 psia, or alternately 5 psia to less than 14.7 psia, or 0 psia to 7 psia. Water generated in the reaction is normally removed from the reaction mixture as it forms. This is typically performed by vacuum stripping, wiped-film evaporation, sparging with dry air or nitrogen, and the like. The reaction is normally continued until a pre-determined amount of water has been collected or a target acid number and/or hydroxyl number is reached for the product.

The amount of hydrophobe incorporated into the polyol is within the range of 3 to 70 wt. %. Alternately, the amount of hydrophobe in the polyol is 4 to 60 wt. % or 5 to 55 wt. %. When less than 3 wt. % of hydrophobe is used, there is too little benefit from including it in terms of generating useful polyols (for instance, the hydroxyl numbers may reach or exceed their useful upper limit). When more than 70 wt. % of the hydrophobe is used, formulation cost may be higher than desirable, and there is usually little or no additional performance benefit.

In another embodiment, the polyester polyol can be made in a single step by reacting the recycled PTT or PET carpet, carpet fibers, yarn; PET containers, textiles, string, twine or other recycled PET or PTT articles or combinations thereof in the recycle stream, glycol, and hydrophobe under conditions effective to produce the polyol. As with polyols made using the two-step process, the molar ratio of glycol to PET (or PTT) is at least 0.8, the amount of hydrophobe reacted into the polyol is within the range of 3 to 70 wt. %, the resulting polyol has an average hydroxyl functionality within the range of 1.8 to 2.7 and a hydroxyl number within the range of 25 to 800 mg KOH/g. When the single-step process is used, it is preferred to utilize a reflux system that returns condensed glycols to the reactor while allowing removal of water, as removal of too much glycol can result in cloudy or opaque polyols. Reaction temperatures in the single step process are as described above for the two-step process. Preferably, a two-step process is used.

The polyester polyols produced by the inventive processes have hydroxyl numbers within the range of 25 to 800 mg KOH/g, preferably 35 to 500 mg KOH/g, more preferably 40 to 400 mg KOH/g. Hydroxyl number can be measured by any accepted method for such a determination, including, e.g., ASTM E-222 ("Standard Test Methods for Hydroxyl Groups Using Acetic Anhydride Acetylation"). The polyols also have average hydroxyl functionalities (i.e., the average number of —OH groups per molecule) within the range of 1.8 to 2.7, preferably 2.0 to 2.5.

In some embodiments, the polyester polyols produced in the inventive process are flowable liquids at temperatures of 25 to 100° C., and have viscosities measured at 25° C. less than 100,000 cP, more preferably less than 30,000 cP, most preferably less than 20,000 cP. A preferred range for the polyol viscosity is 100 to 10,000 cP, more preferably 500 to 5,000 cP. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The polyols produced by the inventive processes preferably have low acid numbers. Low acid numbers can be ensured by driving reactions through removal of water from the reaction mixture to the desired level of completion. Preferably, the polyols have an acid number less than 30 mg KOH/g, more preferably less than 10 mg KOH/g, and most preferably less than 5 mg KOH/g. Acid numbers can be adjusted if necessary for a particular application with an acid scavenger such as, for example, an epoxide derivative, and this treatment can be performed by the manufacturer, distributor, or end user.

In another embodiment, the current subject matter provides a process comprising reacting a recycle stream selected from recycled PET carpet, recycled PET carpet fiber, recycled PET bottles, recycled PET textiles, recycled PET articles, or mixtures thereof, with a glycol in a reactor, thereby forming a digested intermediate comprising polyols and contaminants selected from colorants, dyes, pigments, inorganic fillers, undigested polymers or mixtures thereof. The digested intermediate can be further reacted with a polyisocyanate to form a polyurethane, a polyisocyanurate, or an isocyanate terminated prepolymer. The digested intermediate can also be reacted with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, a modifier or both a hydrophobe and modifier to form polyester polyols as described above. When the digested intermediate is reacted with both a hydrophobe and modifier, the hydrophobe and modifier can either be reacted sequentially with the digested intermediate in any order, or simultaneously. The hydrophobes and modifiers are as described above.

The digested intermediate can be processed in a solid-liquid separation step to separate the contaminants from the contaminants-free polyester polyol. The solid-liquid separation can be conducted using the separations described above: filtration, centrifugation, decantation, flotation, flocculation and sedimentation or combinations thereof.

In one embodiment, where it is desirable to maintain a homogeneous dispersion of contaminants in the polyol, and thereby prevent them from separating, it is preferred that the resulting polyol have a high enough viscosity during storage and shipping such that the dispersed contaminants do not separate by either flotation (for example, the undigested polymer such as a polyolefin or a styrene/butadiene adhesive) or settling (for example, the inorganic fillers). This approach avoids the need for a solid/liquid separation step, and permits the recycle of all components present in the resulting polyol, including the contaminants. Thus, polyols in the digested intermediate preferably have a viscosity greater than 10,000 cps at 50° C., more preferably greater than 20,000 cps at 50° C., and most preferably having a viscosity greater than 30,000 cps at 50° C.

In another alternate embodiment, the current subject matter provides a polyester polyol composition comprising: (i) recurring molecular units obtained from a recycled polymer source selected from recycled PET carpet, recycled PET containers, recycled PET textiles, recycled PET articles or mixtures thereof; (ii) a glycol; and (iii) a contaminant comprising undigested particles of polyolefin and undigested particles of adhesive. The polyester polyol composition can also include: (iv) at least one contaminant selected from colorants, dyes, pigments and inorganic fillers, and/or a hydrophobe, a modifier or mixtures thereof. Preferably, the PET containers are PET bottles from a bottle bale.

In still another alternate embodiment, the present disclosure provides a polyester polyol composition comprising (i) a digested intermediate obtained from a recycled polymer source selected from recycled PET carpet, recycled PET carpet fiber, recycled PET bottle bases, recycled PET textiles, other recycled PET articles, or mixtures thereof; (ii) a glycol; and (iii) at least one of a $C_3$-$C_8$ dicarboxylic acid and a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof.

In another alternate embodiment, the present disclosure provides a polyester polyol composition comprising: (i) a digested intermediate obtained from a recycled polymer source selected from recycled PET carpet, recycled PET carpet fibers, recycled PET bottle bales, recycled PET textiles, other recycled PET articles or mixtures thereof; (ii) a glycol; and (iii) at least one of a $C_3$-$C_8$ dicarboxylic acid and a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof. Preferably, the polyester polyol composition contains both a $C_3$-$C_8$ dicarboxylic acid and a hydrophobe.

Comminution of Recycle Stream

The recycle waste stream can undergo a comminution step to break up the recycled bottles, carpet or other recycled PET or PTT material as described above, prior to contact with glycol and the digestion step. Comminution of the recycled stream produces fragments that take up less volume in the digestion reactor, as well as exposing more surface area for reaction. Such comminution can be conducted via grinding, cutting and shredding or combinations thereof. Grinding involves the application of compression, impact or shear, where the magnitude of the force applied and the duration of the application affect the degree of solids breakup. Grinding equipment that can be used includes jaw crushers, gyratory crushers, shredders, hammer mills, fixed head mills, plate mills, roller mills, ball mills, and edge runner mills. Cutting equipment can include vessels using rotating knives, such as a bowl chopper. Shredding equipment includes chippers and single or multi-shaft shredders. Examples of companies that supply suitable comminution equipment for carpet include SSI Shredding Systems, Inc.; Universal Refiner Corporation; TANA Oy (Finland); and Vecoplan LLC. Examples of companies that supply suitable comminution equipment for PET bottles include WEIMA America, Inc.; Vecoplan LLC; Jaydeep Engineering (India); Jordan Reduction Solutions; Recycling Equipment, Inc.; Forrec Recycling Systems (Italy); and Cresswood Shredding Machinery.

The comminution step can be conducted in a vessel separate from the digestion reactor or in the digestion reactor, provided that comminution proceeds prior to contact with glycol and the digestion reactor using its mixer. Typically, comminution is conducted at temperatures of from −10 to 45° C., and decreases the size of the recycled PET or PTT containing material digested in the digestion reactor to between 0.1 mm and 40 mm.

Metals Separation

Metals are separated from the recycle stream to minimize contamination with downstream products, and to prevent downstream processing difficulties. Magnetic (magnetically susceptible) metals include iron, cobalt, nickel, and steel; non-magnetic, weakly magnetic or induction field detectable metals include stainless steel, lead, chrome, zinc, copper, tin and aluminum. The magnetically susceptible material often includes wire from the bales of PET bottles, but it can also include un-separated metallic trash or other contaminants.

In one embodiment, the metals separation includes a metal detector that analyzes the recycle stream to detect the presence of a metal, for example, as it passes proximate to the detector. When metal is found, it can be removed from the recycle stream, either manually, or through a system that operates automatically. Such automatic systems include, for example, a conveyor that transports the recycle stream past the metal detector. Upon detection of metal, the metal can be removed from the recycle stream using a blast of air or other gas, employing a mechanical device to push or displace the material out of the primary flow of the recycle stream, or the conveyor itself can alter its pathway to remove the metal, e.g., a section of the conveyor can retract to allow material to drop into a rejection vessel. Preferably, the metals separation step produces a stream containing less than 1 wt % of metals.

The magnetic separation equipment can utilize either electromagnetic or permanent magnets or induction field detectors, and can include drum separators, drawer magnets, in-line magnets, including gravity in-line magnets, plate magnets, including plate housing magnets or suspended plate magnets, grate magnets, wedge magnets, or hump or half-hump magnets.

Operation of the magnetic separators can either be batch, semi-batch or continuous. Prior to magnetic separation, the recycle stream can have a concentration of magnetically susceptible material of from 0 to 5 wt. %. Following magnetic separation, the recycle stream will have a concentration of less than 1 wt. %, alternately, less than 0.5 wt. %.

Polyolefin Separation

Polyolefins present in the waste recycle stream do not digest in the glycol. Instead, in certain embodiments they are dispersed into fragments using the high speed, high shear mixer and optionally emulsifiers, to a particle size range from 100 nm to 11 cm, 0.5 mm to 11 cm or 0.5 mm to 3 cm. The polyolefins and other contaminants can be separated through liquid-solid separation steps selected from filtration, centrifugation, decantation, flotation, flocculation and sedimentation or combinations thereof. When the separation is performed by decanting, the digested/reacted liquid is drained, leaving the remaining polyolefin solids. The digested/reacted liquid can be pumped to a storage vessel. The remaining polyolefin solids can be further processed. For example, the solids may be rinsed, dried and extruded into fibers or pellets. During extrusion, various additives, such as compatibilizers, antioxidants, fillers, fibrous or platelet reinforcing agents, stabilizers or colorants can be added.

When the liquid-solid separation is performed by decanting, the temperature of the separation step can range from the digestion/reaction temperatures to room temperature, i.e., from 20 to 100° C. Alternately, the separation can be conducted at temperature ranges of from 50 to 100° C. or 60 to 90° C.

The separation can also be performed by filtration or centrifuging. When the separation is performed by filtration, the filtration can either be gravity filtration through screens or belt filters using conventional separation media, or pressure filtration through plate and frame or pressure filters. As with separation by decanting, the recovered polyolefin solids can then be extruded as described above.

In certain embodiments of the present subject matter, it is preferable to allow the non-digested polyolefin phase to accumulate into a large mass, adhering to and collecting non-digested contaminants within the mass, and then separating the liquid polyol from the polyolefin and non-digested contaminants. The polyolefin phase containing non-digested contaminants can then be recycled into other applications such as artificial wood. Surprisingly, small amounts of adhesives such as ethylene/acrylic acid copolymers or ethylene/methacrylic acid copolymers can be added to the reaction mixture. Such adhesives exit the reaction system with the non-digested polyolefin phase, which enhances the ability of this phase to both agglomerate into a large mass, and the ability to collect and adhere to non-digested contaminants, thereby facilitating their separation from the polyol phase by decanting. It is believed that numerous other non-digesting adhesive materials can be added to the reaction to provide this agglomeration effect, such as polyvinyl acetate, polyvinyl alcohol, polyvinyl butyral, polyvinyl formal, polyvinyl ether, acrylic polymers, polychloroprene, styrene-butadiene copolymers, styrene-diene-styrene copolymers, polyisobutylene, acrylonitrile-butadiene, polyurethane thermoplastics, co- and ter-polymers of ethylene with vinyl acetate, ethyl acrylate, butyl acrylate, methyl acrylate, acrylic acid and combinations thereof. In this case, the temperature of the separation step can range from the digestion/reaction temperatures to room temperature, i.e., from 20 to 230° C. Preferably, the separation can be conducted at lower temperature ranges, e.g., from 90 to 190° C.

Carbon Bed Filtration

A carbon bed can be used to remove some of the colorants present as organic molecules in the polyester polyol, e.g., the source of the colorants is typically the colored caps or tinted bottles that may be present in the recycle PET bottles or other PET or PTT based recycle materials.

The digested intermediate is treated with activated carbon under conditions effective to give a polyester polyol with reduced color and measured by the color index. Color index is defined by $100 \times (|a^*|/L^*)$ as measured by CIE colorimetric analysis. The carbon-treated polyol will have a higher value, usually a low negative value. The absolute value of $a^*$ (i.e., $|a^*|$) is used to compute the color index using the above formula. Any suitable means can be used to perform the colorimetric analysis via transmission through the liquid polyol. It is convenient to measure transmission spectral properties using a spectrophotometer such as a Cary® 100 Conc UV/vis spectrophotometer (Varian), an X-Rite color 8200 spectrophotometer, an X-Rite color i7 spectrophotometer, or similar equipment.

Activated carbon comes in many suitable forms, and the form actually used will depend on reactor design, process scale, the nature of the digested intermediate to be treated, and other factors. The activated carbon is normally produced from carbonaceous sources such as nutshells, coconut husks, peat, wood, coal, or other sources. Raw material is typically activated and/or carbonized chemically by treatment with acids, bases, or salts at temperatures up to about 900° C. Thereafter, it may be carbonized and/or oxidized by heating either in the presence or absence of an oxygen-containing gas (e.g., air or steam) at 600° C. or higher. A combination of treatments can be used. Suitable activated carbons are supplied as powders, granules, beads, extrudates, or other forms. Preferably, the activated carbon has a surface area greater than 300 $m^2/g$, more preferably greater than 500 $m^2/g$. A preferred range for the surface area is 500 $m^2/g$ to 2000 $m^2/g$. Suppliers include, for example, Paro Chemical, Jacobi Carbons, Calgon Carbon, Norit Americas, and many others.

The amount of activated carbon needed will depend on the source of the recycled material, the treatment unit design, temperature, the degree of color reduction needed, and other factors. Preferably, the activated carbon is used in an amount within the range of 0.1 to 10 wt. %, more preferably 0.5 to 5 wt. %, based on the amount of digested intermediate to be treated.

The carbon treatment is preferably performed by combining a warm or hot (30° C. to 180° C., preferably 45° C. to 150° C., most preferably 50° C. to 120° C.) digested material with the activated carbon, mixing until homogeneous, and allowing the carbon and digested intermediate to remain in contact for several minutes to several hours, preferably from 10 minutes to 4 hours. It is convenient to simply stir the carbon-treated intermediate at the desired temperature for the duration of the treatment.

Following treatment with activated carbon, the digested recycled material is filtered, optionally using a filter aid such as diatomaceous earth (e.g., Celite® 545), molecular sieves, clays, inorganic oxides (aluminas, silicas, silica-aluminas, magnesium silicates, etc.), or the like. Diatomaceous earth is particularly preferred. Filtration, especially when using a filter aid, removes the activated carbon, impurities adsorbed by the activated carbon, undigested PET or PTT particles, and other insoluble material including residual plastics, metal, paper, or other impurities. Heat, pressure, recirculation through the filtration medium to effectively produce multiple filtrations, or some combination of these may be used to reduce filtration time or improve results. It may be desirable, for instance, to pre-heat the filter and/or polyol before use and to perform the filtration in the presence of heat to reduce viscosity and enhance process efficiency. Additionally, it may be desirable to perform multiple filtrations to obtain a more highly purified polyester polyol. If desired, bleaching earths and bleaching clays can be used for reducing or lowering the color of the polyols, such as, e.g., F1 or F76, commercially available from BASF.

The polyester polyols produced by the inventive process can be used to formulate a wide variety of polyurethane and polyisocyanurate products. By adjusting the proportion of hydrophobe used, a targeted degree of polyol hydrophobicity can be achieved. The ability to control hydrophobicity is particularly valuable in the coatings industry. The polyols can be used for cellular, microcellular, and non-cellular applications including flexible foams, rigid foams (including polyisocyanurate foams), urethane dispersions, coatings, adhesives, sealants, urethane acrylate derivative coatings, powder coatings, tank coatings, and elastomers. The resulting polyurethanes and polyisocyanurates are potentially useful for automotive and transportation applications, building and construction products, marine products, packaging foam, flexible slabstock foam, carpet backing, appliance insulation, cast elastomers and moldings, footwear, bio-medical devices, and other applications.

(Meth)Acrylate Derivatives

The polyester polyols obtained in the inventive process described above can be esterified with acrylic acid or methacrylic acid with the simultaneous elimination of water to form (meth)acrylate derivatives. The reaction is typically conducted in the presence of an air or oxygen purge at temperatures below about 140° C. and in the presence of a free radical scavenger to avoid free radical polymerization of the (meth)acrylate functionality. Suitable free radical scavengers include, for example, phenothiazine, butylated hydroxyl toluene and 1,4-hydroquinone at levels between about 0.001 and 0.5% by weight.

(Meth)acrylate derivatives may also be formed by the reaction of acryloyl chloride or methacryloyl chloride with the polyester polyols obtained in the inventive process described above, with the simultaneous elimination of hydrochloric acid, also in the presence of the above mentioned suitable free radical scavengers. (Meth)acrylate derivatives find utility as UV-, peroxide-, oxidative-, or radiation-curable oligomers for a variety of coating applications.

Urethane (Meth)Acrylates

Urethane (meth)acrylates may also be prepared using the polyester polyols obtained by the inventive process described above, by reacting hydroxyethyl (meth)acrylate with an isocyanate-terminated prepolymer. A variety of metal catalysts may be utilized to facilitate the formation of these prepolymers, including tin, bismuth, and zinc catalysts. The reaction is typically conducted in the presence of an air or oxygen purge at temperatures below about 140° C., and in the presence of a free radical scavenger to avoid free radical polymerization of the (meth)acrylate functionality. Suitable free radical scavengers include, for example, phenothiazine, butylated hydroxyl toluene and 1,4-hydroquinone at levels between about 0.001 and 0.5% by weight. Urethane (meth)acrylate derivatives find utility as UV-, peroxide-, oxidative-, or radiation-curable oligomers for a variety of coating applications.

The reaction product of an excess of polyisocyanate with the above described polyester polyols can also yield isocyanate-terminated prepolymers. By adjusting the isocyanate to hydroxyl ratio, urethane functionality can also result in the prepolymer. Isocyanate terminated prepolymers are typically viscous liquids that may subsequently be converted to high molecular weight polyurethanes via further reaction with water, glycols, other polyols or polyamines. The isocyanate terminated prepolymer can be reacted with hydroxyethyl methacrylate or hydroxyethyl acrylate to provide a urethane acrylate resin or a urethane methacrylate resin.

Plasticizers

Polymeric Plasticizers—Recycled PET

A recycle stream containing recycled PET and PTT containers, carpet, carpet fiber, textiles or fabric can be reacted to form a polymeric plasticizer. In one embodiment, the plasticizer is produced by reacting: (a) the PET or PTT recycle stream; (b) a glycol; (c) a $C_4$-$C_{36}$ monocarboxylic acid, ester or anhydride thereof; and (d) a diacid, to form a polymeric plasticizer. In another embodiment, the plasticizer can be produced by reacting: (a) the recycle stream; (b) a glycol; (c) a mono-alcohol; and (d) a diacid.

The recycle stream containing recycled PET and PTT containers, carpet, carpet fiber, textiles or fabric is as described above.

Glycols used to produce the polymeric plasticizer include ethylene glycol, propylene glycol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 2-methyl-1,3-propanediol, neopentyl glycol, glycerol, trimethylolpropane, 3-methyl-1,5-pentanediol, 1,4-cyclohexanedimethanol, 1,3-cyclohexanedimethanol, diethylene glycol, tetraethylene glycol, dipropylene glycol, triethylene glycol, tripropylene glycol, polyethylene glycol, polypropylene glycol, polycarbonate polyols, pentaerythritol, and block or random copolymer glycols of ethylene oxide and propylene oxide, aliphatic polyester polyols, 2,2,4,4-tetramethyl-1,3-cyclobutanediol, and combinations thereof.

By "monocarboxylic acid", is meant that the acid, or the ester or anhydride derived therefrom, is based on a carboxylic acid compound having a single carboxylic acid group. An example of such a carboxylic acid is the $C_6$ monocarboxylic acid, hexanoic acid. An example of an ester is the ethyl ester of hexanoic acid, which is known as ethyl hexanoate. An example of an anhydride is hexanoic acid anhydride, which is also known as hexanoic anhydride. Additionally, the anhydride can be a mixed anhydride from two different carboxylic acids, as long as one of the acids is from a $C_4$-$C_{36}$ monocarboxylic acid. Such an example would be the mixed anhydride of hexanoic acid (a $C_6$ monocarboxylic acid, which meets the $C_4$-$C_{36}$ requirement) and acetic acid (a $C_2$ acid).

In general, the $C_4$-$C_{36}$ monocarboxylic acid, ester or anhydride thereof can function as a chain terminator in the preparation of the polymeric plasticizer compositions because when it is incorporated into the polymerization reaction, it can cap the ends of the polymer chain structure.

The $C_4$-$C_{36}$ monocarboxylic acid, ester or anhydride thereof can be selected from straight, branched or cyclic aliphatic compounds that can be either saturated or unsaturated. Furthermore, aromatic compounds are also included. Additionally, for the esters, the alcohol-derived portion is preferably derived from an alcohol having from one to seven carbon atoms, i.e. $C_1$ to $C_7$. Examples of $C_4$-$C_{36}$ monocarboxylic acid esters also include the $C_1$ to $C_7$ alcohol esters of the $C_4$-$C_{36}$ monocarboxylic acids, in other words $C_4$-$C_{36}$ monocarboxylic acids that have been esterified with $C_1$ to $C_7$ alcohols. These $C_1$ to $C_7$ alcohols can include aromatic alcohols. Examples of $C_4$-$C_{36}$ monocarboxylic acid esters include alkyl benzoates, alkyl phenylacetates, alkyl esters of branched or linear saturated or unsaturated alkyl carboxylic acids, alkyl naphthenoates, alkyl norbornene carboxylates, alkyl 2-furanoates, and combinations thereof.

Examples of $C_4$-$C_{36}$ monocarboxylic anhydrides include anhydrides of benzoic acid, benzene acetic acid, branched or linear saturated or unsaturated alkyl carboxylic acids, naphthenic acid, norbornene carboxylic acid, 2-furoic acid, and combinations thereof. Additionally, the anhydrides can include mixed anhydrides derived from two different carboxylic acids, such as a mixed anhydride of benzoic acid and benzene acetic acid.

Suitable diacids that can be used to produce the polymeric plasticizers include succinic acid, glutaric acid, pimelic acid, suberic acid, succinic acid, pimelic acid azelaic acid, sebacic acid, adipic acid, fumaric acid, maleic acid, 1,2-cyclohexane dicarboxylic acid, 1,3-cyclohexane dicarboxylic acid, 1,4-cyclohexane dicarboxylic acid, 2,5-furan dicarboxylic acid, 1,9-nonanedioic acid, 1,9-nonenedioic acid, 1,10-decanedioic acid, 1,10-decenedioic acid, 1,11-undecanedioic acid, 1,11-undecenedioic acid, 1,18-octadecanedioic acid, 1,18- octadecenedioic acid, 1,12-dodecanedioic acid, 1,12-dodecenedioic acid, 1,14-tetradecanedioic acid, 1,14-tetradecenedioic acid, 1,16-hexadecanedioic acid, 1,16-hexadecenedioic acid, eicosenedioic acid, eicosanedioic acid, docosanedioic acid, tetracosanedioic acid, tetracosendioic acid, and combinations thereof.

Suitable mono alcohols for the production of the polymeric plasticizer include $C_4$-$C_{36}$ mono alcohols. It is understood that these $C_4$-$C_{36}$ alcohols are intended to be distinct from the required glycol (i.e. the diol) of the present invention. It is intended that alcohols lower than $C_4$ generally are too volatile and do not have desirable characteristics for incorporation herein. The $C_4$-$C_{36}$ alcohol can be selected from straight, branched or cyclic aliphatic compounds that can be either saturated or unsaturated. Aromatic compounds are also intended. Also, alkoxylated alcohols are contemplated herein.

Useful $C_4$-$C_{36}$ alcohols include those selected from norborneol, alkoxylates of branched or linear alkyl phenols, branched or linear saturated or unsaturated alkyl alcohols, alkoxylated branched or linear saturated or unsaturated alkyl alcohols, 2-phenoxy ethanol, 2-phenoxy propanol, benzyl alcohol, furfuryl alcohol, alkoxylated furfuryl alcohol, 2-(hydroxymethyl)tetrahydrofuran, 6,6-dimethyl-2-norpinen-2-ethanol, and alkoxylated 6,6-dimethyl-2-norpinen-2-ethanol, cyclohexanol, alkoxylated cyclohexanol, 2-cyclohexylethanol, alkoxylated 2-cyclohexyl ethanol, 2-cyclohexyloxyethanol, 1-ethynyl-1-cyclohexanol, 2-phenylethanol, alkoxylated 2-phenyl ethanol, alkoxylated phenols, alkoxylated norborneol, farnesol, hydrogenated farnesol, geraniol, hydrogenated geraniol, 2-ethyl-1-hexanol, and combinations thereof.

To form the polymeric plasticizer, the recycled PET material is digested with the glycol in a reactor as described above. Then, the reaction mixture is cooled to 100-130° C. and the other reactants: $C_4$-$C_{36}$ monocarboxylic acid, ester, anhydride, or combination thereof; diacid; or mono alcohol are added. A reaction temperature is controlled between 180-250° C., and the esterification reaction is performed under nitrogen sparging conditions. Any esterification by-product, for example water, and/or transesterification by-product, for example methanol or other alcohols, is eliminated from the reaction system. The reaction is allowed to proceed until the desired acid number is achieved.

Polymeric Plasticizers—Recycled PTT

A recycle stream containing recycled polytrimethylene terephthalate (PTT) carpet can be digested and reacted as described above to form a polymeric plasticizer. In this embodiment, a stream of recycled PTT carpet is reacted with a glycol in a reactor, thereby forming a digested product stream comprising polyols, and at least one undigested stream.

After digestion of the PTT as described above, the reaction mixture is cooled to 100-130° C. and the other reactants: $C_4$-$C_{36}$ monocarboxylic acid, ester, anhydride, or combination thereof; diacid; or mono alcohol are added. A reaction temperature is controlled between 180-250° C., and the esterification reaction is performed under nitrogen sparging conditions. Any esterification by-product, for example water, and/or transesterification by-product, for example methanol or other alcohols, is eliminated from the reaction system. The reaction is allowed to proceed until the desired acid number is achieved.

Monomeric Plasticizers—PET & PTT Carpet

PET or PTT recycle carpet fibers can be reacted with a mono alcohol to form a monomeric plasticizer. These carpet fibers can be obtained by shaving, skiving or as otherwise described above to remove the carpet backing. Preferably, the mono alcohol is a $C_4$-$C_{36}$ mono alcohol. The $C_4$-$C_{36}$ mono alcohol can be selected from straight, branched or cyclic aliphatic compounds that can be either saturated or unsaturated. Aromatic compounds are also included, as well as alkoxylated alcohols. Useful $C_4$-$C_{36}$ alcohols include those selected from norborneol, alkoxylates of branched or linear alkyl phenols, branched or linear saturated or unsaturated alkyl alcohols, alkoxylated branched or linear saturated or unsaturated alkyl alcohols, 2-phenoxy ethanol, 2-phenoxy propanol, benzyl alcohol, furfuryl alcohol, alkoxylated furfuryl alcohol, 2-(hydroxymethyl)tetrahydrofuran, 6,6-dimethyl-2-norpinen-2-ethanol, and alkoxylated 6,6-dimethyl-2-norpinen-2-ethanol, cyclohexanol, alkoxylated cyclohexanol, 2-cyclohexylethanol, alkoxylated 2-cyclohexyl ethanol, 2-cyclohexyloxyethanol, 1-ethynyl-1-cyclohexanol, 2-phenylethanol, alkoxylated 2-phenyl ethanol, alkoxylated phenols, alkoxylated norborneol, farnesol, hydrogenated farnesol, geraniol, hydrogenated geraniol, and combinations thereof.

More preferably, the mono alcohol used to prepare the monomeric plasticizer is 2-ethylhexanol.

Preferably, the monomeric plasticizer product is dioctyl terephthalate.

To prepare the monomeric plasticizer, the PET or PTT carpet fibers are reacted with the mono alcohol in a reactor at 180 to 250° C., preferably 185 to 200° C. for 8 to 48 hours. The resultant material is then filtered to remove solids. Then excess alcohol and glycol are stripped off, e.g., via nitrogen stripping. A final filtration using a 3 to 10 micron filter can be used to remove fine particles that are indigestible and were not removed in previous filtrations.

Preferably, the plasticizers (polymeric or monomeric) prepared using the polyols of the inventive process described above have hydroxyl values of less than 2. The plasticizers also preferably have hydroxyl numbers of 25 to 800 mg KOH/g, more preferably 35 to 500 mg KOH/g, and even more preferably 40 to 400 mg KOH/g; acid numbers preferably, less than 30 mg KOH/g, more preferably less than 10 mg KOH/g, and most preferably less than 5 mg KOH/g; and preferably a viscosity of 100 to 10,000 cP, more preferably 100 to 5,000 cP, and even more preferably 500 to 5,000 cP.

PET & PTT Preparation from Recycled PET & PTT Carpet

PET or PTT recycle carpet fibers can be reprocessed to produce new PET or PTT carpet. In this process, the shaved carpet fiber is glycolized with a diol to form a raw product stream containing liquid diol with oligomers of PTT or PET such as bishydroxyethyl terephthalate (BHET) and bishydroxypropyl terephthalate (BHPT). The raw product stream is then subjected to a polycondensation reaction to form a product stream containing the PTT or PET. Preferably, the diols used to glycolize the carpet files are 1,3 propane diol and ethylene glycol. PTT may be formed by simply heating the polyol resulting from the glycolysis of PTT with 1,3-propanediol while removing 1,3-propanediol via distillation until a high molecular weight polymer is formed. PET may be formed by simply heating the polyol resulting from the glycolysis of PET with ethylene glycol while removing ethylene glycol via distillation until a high molecular weight polymer is formed.

Referring to FIG. 1, shown is a flow diagram of a process for the production of polyester polyols and polyurethanes or polyisocyanurates from recycled PET bottles. A PET bottle recycle stream 1 containing polyolefins and various other contaminants is treated in a comminution process step 100 to break up the bottles and reduce the size of the bottle fragments. The resulting comminuted stream 2 is then subjected to a metals separation process step 101 where a metals stream 3 is separated from the de-metaled PET bottle stream 4. Both magnetic and non-magnetic (conductive) metals can be removed in this step. The de-metaled PET bottle stream 4 is then processed in a digestion/reaction process step 102 where it is digested in a glycol 13 and reacted with a stream 14 containing a hydrophobe and/or a modifier to form a polyester polyol stream 5 containing polyolefins. An agglomeration adhesion promoter may be optionally added during this process step to facilitate agglomeration of contaminants and polyolefins into a single phase. The polyester polyol stream 5 is then subjected to a liquid-solid separation process step 103, where a solid polyolefin stream 7 is separated from the liquid polyester polyol stream 6. The liquid polyester polyol stream 6 is then treated in a carbon bed contacting process step 104 to remove color bodies from the liquid polyester polyol stream 6. A decolorized polyester polyol stream 8 exits the carbon bed contacting process step 104 and is routed to a polyurethane or polyisocyanurate production step 105 where it is reacted with a polyisocyanate stream 9 to form a polyurethane, polyisocyanurate, or isocyanate-terminated prepolymer stream 10. The separated polyolefin stream 7 is routed to a polyolefins stream processing step 106 where the polyolefins are cleaned by washing or steaming, dried and then extruded to form a polyolefin product stream 12 in the form of pellets or fibers.

Figure 2:
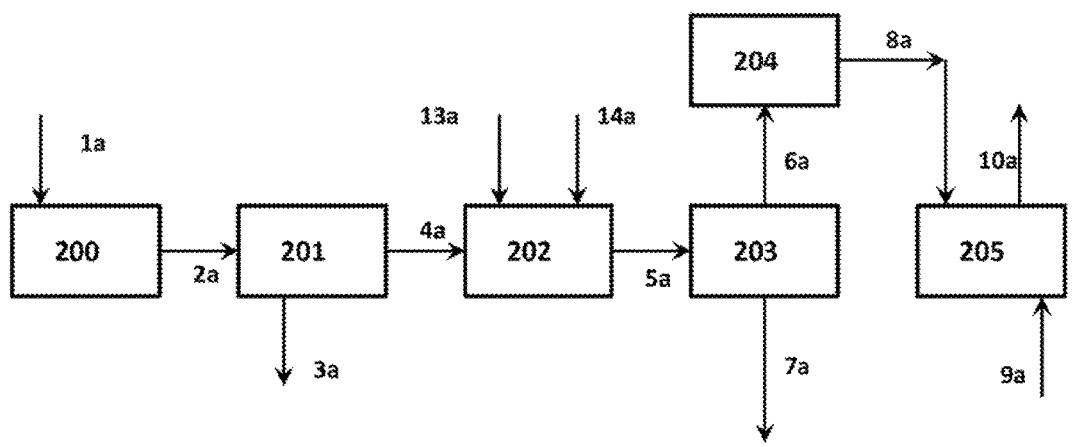
FIG. 2 illustrates a flow diagram of a process to produce polyester polyols from recycled PET carpet.

Referring to FIG. 2, shown is a flow diagram of a process for the production of polyester polyols and polyurethanes or polyisocyanurates from recycled PET carpet fibers. A PET carpet recycle stream 1a is treated in a comminution process step 200 to remove the carpet fibers from the carpet backing. The resulting comminuted stream 2a is then subjected to a metals separation process step 201 where a metals stream 3a is separated from the de-metaled PET carpet fiber stream 4a. Both magnetic and non-magnetic (conductive) metals can be removed in this step. The de-metaled PET carpet fiber stream 4a is then processed in a digestion/reaction process step 202 where it is digested in a glycol 13a and reacted with a stream 14a containing a hydrophobe and/or a modifier to form a polyester polyol stream 5a. The polyester polyol stream 5a is then subjected to a liquid-solid separation process step 203, where a filtered solids stream 7a is separated from the liquid polyester polyol stream 6a. The liquid polyester polyol stream 6a is then treated in a carbon bed contacting process step 204 to remove color bodies from the liquid polyester polyol stream 6a. A decolorized polyester polyol stream 8a exits the carbon bed contacting process step 204 and is routed to a polyurethanes or polyisocyanurates production step 205 where it is reacted with a polyisocyanate stream 9a to form a polyurethane, polyisocyanurate, or isocyanate-terminated prepolymer stream 10a.

Figure 3:
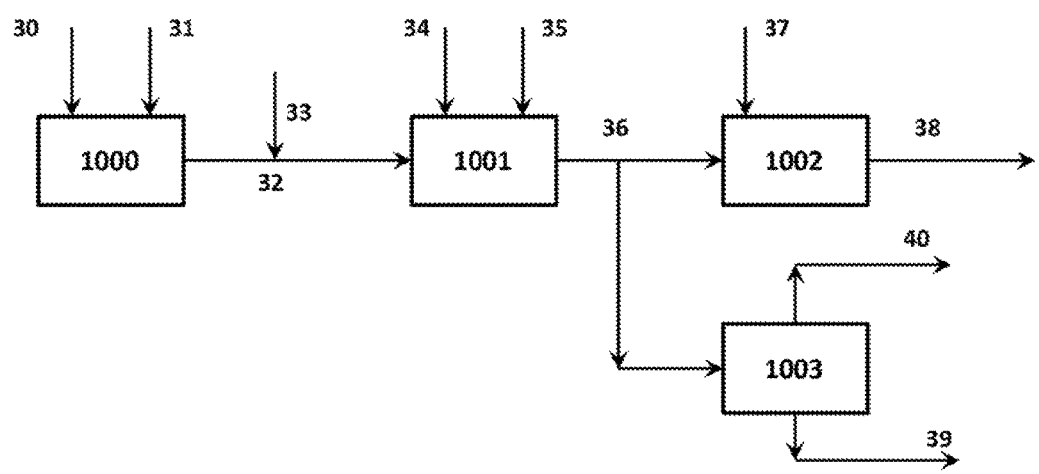
FIG. 3 illustrates a flow diagram of a process to produce polyester polyols from a recycle stream of PET carpet, bottles, textiles and articles where the digested stream is reacted with hydrophobes and/or modifiers prior to separation of the contaminants.

Referring to FIG. 3, shown is a flow diagram of a process for the production of polyester polyols from a recycle stream 30 of recycled PET carpet, recycled PET bottles, recycled PET textiles and recycled PET articles, where the recycle stream 30 is digested with glycol 31 in a digestion step 1000 to produce a stream 32 containing digested polyols and contaminants. Optionally, emulsifiers or adhesives can be introduced into stream 32 by stream 33. The digested polyols and contaminants stream 32 is reacted with hydrophobes 34 and/or modifier 35 in reaction step 1001. A polyester polyol and contaminants stream 36 exits the reaction step 1001. The polyester polyol and contaminants stream 36 can be processed in a polyurethane, polyisocyanurates, or isocyanate-terminated prepolymer production step 1002 by reaction with a polyisocyanate stream 37 to produce a polyurethane, polyisocyanurate or isocyanate-terminated prepolymer stream 38. Alternately, the polyester polyols and contaminants stream 36 can be processed in liquid-solid separation step 1003 where the liquid polyester polyol stream 40 is separated from the solid contaminants stream 39.

Figure 4:
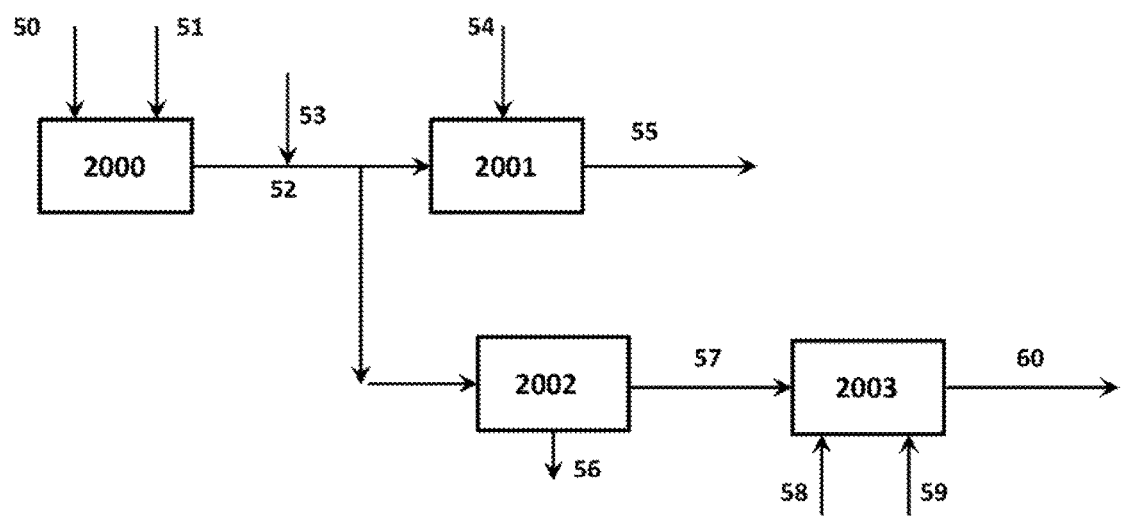
FIG. 4 illustrates a flow diagram of a process to produce polyester polyols from a recycle stream of PET carpet, bottles, textiles and articles where the digested stream is reacted with hydrophobes and/or modifiers after separation of the contaminants.

Referring to FIG. 4, shown is a flow diagram of a process for the production of polyester polyols from a recycle stream 50 of recycled PET carpet, recycled PET bottles, recycled PET textiles and recycled PET articles, where the recycle stream 50 is digested with glycol 51 in a digestion step 2000 to produce a stream 52 containing digested polyols and contaminants. Optionally, emulsifiers or adhesives can be introduced into stream 52 by stream 53. The digested polyols and contaminants stream 52 can be processed in a polyurethane, polyisocyanurates or isocyanate-terminated prepolymer production step 2001 by reaction with a polyisocyanate stream 54 to produce a polyurethane, polyisocyanurate or isocyanate-terminated prepolymer stream 55. Alternately, the digested polyols and contaminants stream 52 can be processed in a liquid-solid separation step 2002 to produce a liquid polyol stream 57 and a solid contaminants stream 56. The liquid polyol stream 57 is reacted with hydrophobes 58 and/or modifier 59 in reaction step 2003, to produce a polyester polyol 60.

Integrated Process

Figure 5:
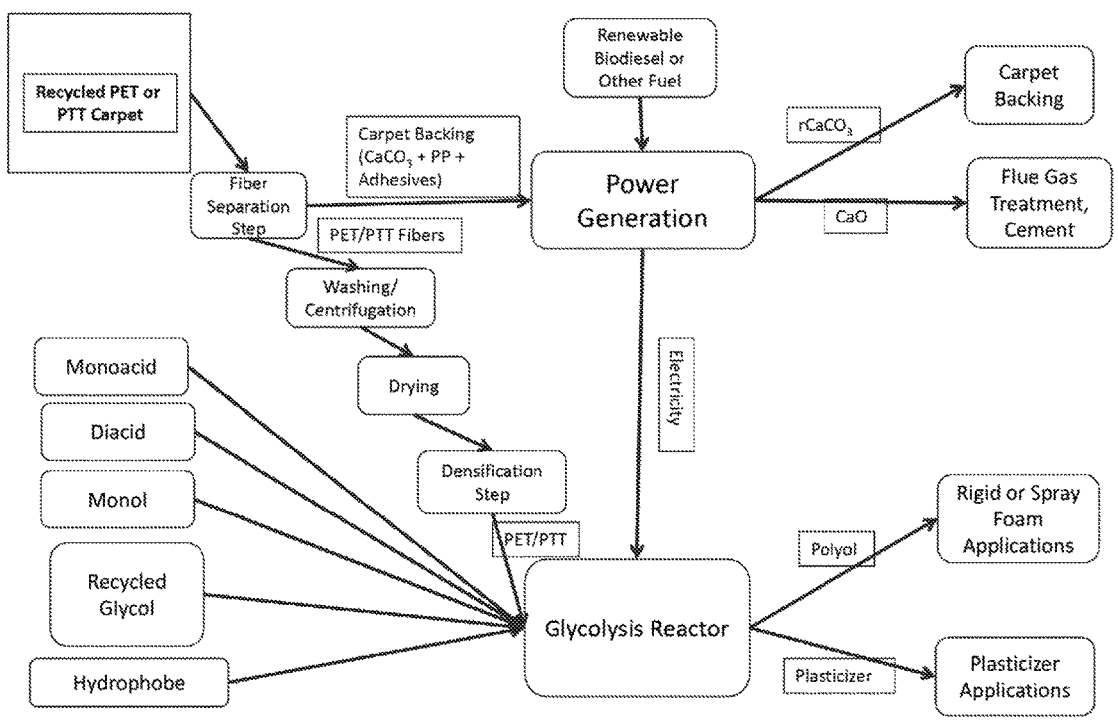
FIG. 5 illustrates an integrated process for using recycled PET or PTT-based carpet to produce polyols that can be used in rigid foams, polyisocyanurate foams, polyurethane polymers, or flexible polyurethane foams; monomeric plasticizers; polymeric plasticizers; recycled calcium carbonate; quick lime; slaked lime; PET; or PTT in an environmentally friendly and energy efficient manner.

Referring to FIG. 5 shown is an integrated process for using recycled PET or PTT-based carpet to produce polyols that can be used in rigid foams, polyisocyanurate foams, polyurethane polymers, or flexible polyurethane foams; monomeric plasticizers; polymeric plasticizers; recycled calcium carbonate; quick lime; slaked lime; PET; or PTT in an environmental-friendly and energy efficient way. The recycled PET or PTT-based carpet is treated by first separating the top surface carpet fibers from the primary carpet backing, the secondary carpet backing and the adhesive layer used to bind the carpet structure together. Usually, the adhesive layer contains calcium carbonate as a filler, while the secondary backing usually contains a polyolefin such as polypropylene. The primary backing may consist of a variety of polymers. The separated fibers are treated by a step such as washing to remove dirt, mold, hair and other contaminants; filtered, dried, and then densified by extrusion to form pellets which are then fed to a glycolysis reactor. The separated backing is fed to an incinerator, kiln or gasifier in a power generation system, where the backing is combusted, optionally along with other renewable or recycle-content waste fuels such as biodiesel, municipal waste, agricultural waste or lignin. The heat of combustion is recovered via the production of steam in a boiler, which in turn is utilized in a steam turbine to produce electricity. This electricity is then utilized by the glycolysis reactor. Calcium exiting the combustion system will either be present as calcium carbonate, which can be recycled into carpet backing applications, or calcium oxide (quick lime) or calcium hydroxide (slaked lime), which can be used in industrial and agricultural applications. In one aspect of the invention, the quick lime or slaked lime is used to treat the acidic gases produced in the combustion process.

The densified and comminuted PET or PTT carpet fibers are routed to the glycolysis reactor where they are then glycolyzed or reacted with hydrophobes, monoacids, diacids or monols, glycols, water, or combinations thereof to produce polyols that can be used in rigid foams, polyisocyanurate foams, polyurethane polymers, or flexible polyurethane foams; monomeric plasticizers; or polymeric plasticizers.

EXAMPLES

The following examples merely illustrate the invention; the skilled person will recognize many variations that are within the spirit of the invention and scope of the claims.

Hydroxyl numbers and acid numbers are determined by standard methods (ASTM E-222 and ASTM D3339, respectively).

Viscosities are measured at 25° C. using a Brookfield DV-III Ultra rheometer with spindle #31 at 25%, 50%, and 75% torque in a Thermosel accessory for temperature control.

Color, clarity, and degree of settling are evaluated visually.

Example 1 Digestion of Recycled PET Bottles

A polyester polyol was produced using a Littleford FM130 reactor equipped with a plow mixer and high speed chopper mixer, commercially available from Littleford Day, Inc. Recycled PET bottles (12.9 kg) including caps, lids and labels were added through the top port of the reactor with the chopper operating at 3600 RPM and the reactor plow mixer at 1 RPM. During addition of the bottles, the reactor jacket was maintained at 230° C. After the shredding of the bottles, the reactor contents were heated to 135° C. at a pressure of 25 inches of Hg for one hour. Vacuum was shut off and the reactor was opened to verify that bottles had been shredded. Propylene glycol (13.72 kg), commercially available from EMCO, was charged to the reactor along with 43.5 grams of titanium (IV) t-butoxide catalyst, commercially available from Sigma Aldrich.

The reactor contents were heated from 197° C. to 200° C. and allowed to react for 5 hours 30 minutes. The PET appeared to be fully digested with small, dispersed pieces of polyolefin from the caps floating at the top of the digested liquid. The reactor contents were then allowed to sit overnight.

Dimer fatty acid (11.9 kg) (Pripol™ 1017), commercially available from Croda was then added to the reactor and the plow mixer was operated at 1 RPM. The reaction was conducted at 172-175° C. at 26 inches of Hg vacuum until all water was removed. The OHV (hydroxyl value) for the polyol was 214.6 mg KOH/g of sample with an acid value of 0.9.

Example 2 Digestion/Reaction of Recycled PET Carpet

A 2000 mL resin kettle equipped with an overhead mixer, Vigreux column, short path condenser head with distillation collection flask, heating mantle, thermocouple, and nitrogen inlet was charged with recycled propylene glycol (152.80 g), recycled PET polyester carpet including polyolefin backing, calcium carbonate filler, and latex adhesive (142.80 g), and titanium (IV) butoxide (0.58 g) (~0.1% by wt.). It was assumed that the carpet contained 90% of PET. The mixture was heated with a stirring rate of 150 RPM and nitrogen flow at 0.3 SCFH to 200° C. for 20 hours. After about 5 hours, the recycled PET carpet had completely dissolved and appeared to be completely digested. The mixture was heated overnight to ensure no particles of recycled PET carpet remained. The mixture was then cooled to about 100° C. Dimer fatty acid (190.88 g) (Croda Pripol™ 1017) was added, while the mixing rate was increased to 350 rpm. When the addition was complete, the mixture was then heated to 200° C., and nitrogen was increased to 1.0 SCFH. Water generated in the condensation reaction was collected in the distillation flask until roughly the theoretical amount was removed. When the reaction was complete, the reactor was allowed to cool to 100° C. and then poured into a jar. Undigested polyolefin backing was removed by forceps and the mixture of polyol with calcium carbonate was run through a glass fritted disc filter size 'F' ((4.0-5.5 μm)) at about 80° C. The resulting transparent dark amber polyol had an OHV (hydroxyl value) of 353.0 mg KOH/g of sample and a viscosity at 25° C. of 3000 cP (centipoise).

Example 3 Digestion/Reaction of Recycled PET Textile

A 500 mL reactor equipped with an overhead mixer, Vigreux column, short path condenser head with distillation collection flask, heating mantle, thermocouple, and nitrogen inlet was charged with recycled propylene glycol (97.91 g), recycled PET textile (48.50 g), and titanium tetrabutoxide (0.30 g) (~0.1% by wt.) and heated with stirring to 200° C. for 6.0 hr. After about 5 hours, the recycled PET textile had completely dissolved and appeared to be completely digested. The mixture was heated until no particles of recycled PET polyester textile remained (about 6 hr). When the digestion reaction was considered complete, the mixture was cooled to about 100° C. Soybean oil (65.80 g) and phthalic anhydride (37.50 g) were added, while the mixing rate was increased to 200 rpm. When the addition was complete, the mixture was then heated to 210° C. Water generated in the condensation reaction was collected in the distillation flask until roughly the theoretical amount was removed. When the reaction was complete, the digested intermediate was allowed to cool to 100° C. and then decanted from the reactor. Any large residual solids were removed by filtration through cheesecloth. The resulting opaque dark purple-red polyol had an OHV (hydroxyl value) of 420.7 mg KOH/g of sample and a viscosity at 25° C. of 576 cP (centipoise). The final product was then further filtered through a Buchner funnel with filter paper to remove any residual solids that were not removed by the cheesecloth. The resulting filtered transparent dark purple-red polyol had an OHV (hydroxyl value) of 429.9 mg KOH/g of sample and a viscosity at 25° C. of 588 cP (centipoise).

Example 4 Digestion/Reaction of PET Fibers

A 500 mL reactor equipped with an overhead mixer, Vigreux column, short path condenser head with distillation collection flask, heating mantle, thermocouple, and nitrogen inlet was charged with 110.83 g of a previously prepared aromatic polyester polyol consisting of dimer fatty acid (39.3% by weight), recycled PET pellets (28.7% by weight) and recycled propylene glycol (31.9% by weight) and 7.29 g of recycled polyester fiber fill. The mixture was heated with stirring to 205° C. for 5.0 hr. After about 2.5 hours, the polyester fibers had completely dissolved and appeared to be completely digested. The mixture was heated until no particles of polyester fibers remained (about 5 hr). When the reaction was complete, the digested intermediate was allowed to cool to 100° C. and then decanted from the reactor. Any residual undigested particulate solids were removed by filtration through cheesecloth. The resulting opaque yellow polyol had an OHV (hydroxyl value) of 351.5 mg KOH/g of sample and a viscosity at 25° C. of 5577 cP.

Example 5 Polymeric Plasticizer from Recycled PET Bottles

A 1000 mL 4 neck round bottom flask equipped with an overhead mixer, 8 inch Allihn water condenser, short path condenser head with distillation collection flask, heating mantle, thermocouple, and nitrogen inlet was charged with propylene glycol (166.79 g), glycerol (104.13 g), and a simulated ground (flaked) PET bottle bale stream (270.26 g). The mixture was heated under nitrogen flow at 205° C., titanium (IV) butoxide (1.30 g) (0.24% by wt.) catalyst was added when the reaction was above 110° C. After the flakes were digested by the glycols present. The mixture was then cooled to about 120° C. and filtered through a fritted glass disc funnel. The filtered material (350.00 g) was charged back into a 1000 mL 4 neck round bottom with overhead mixing, 10 inch silver vacuum jacketed column, short path condenser head with distillation collection flask, heating mantle, thermocouple, and nitrogen inlet purge. Succinic acid (167.72 g) and decanoic acid (365.01 g) were added to the reactor. The mixture was heated to 160° C. and held for 2 hours, and then heated up to 215° C. stepwise along with varied nitrogen flow rate. The esterification reaction was completed when acid value is less than 2 mgKOH/g. The reactor was allowed to cool to 100° C. and then poured into a jar. The resulting polymeric plasticizer had an OHV (hydroxyl value) of 11.6 mg KOH/g of sample, an acid value of 1.3 mg KOH/g of sample, and a viscosity at 25° C. of 4,323 cP (centipoise).

Example 6 Polymeric Plasticizer from Recycled PET Carpet

A 2000 mL 4 neck round bottom flask equipped with an overhead mixer, 8 inch Allihn water condenser, short path condenser head with distillation collection flask, heating mantle, thermocouple, and nitrogen inlet was charged with propylene glycol (162.86 g), glycerol (101.68 g), and shredded recycled 'E-PET' polyester carpet from Interface, Inc., (250.00 g). The mixture was heated under nitrogen to 200° C., titanium (IV) butoxide (1.27 g) catalyst was added when the reaction was above 110° C. The reaction was held at 200° C. for 3 hours, and then temperature was increased to 205° C. When the recycled PET carpet dissolved and appeared to be completely digested, the mixture was then cooled to about 120° C. and filtered through a fritted glass disc funnel. The filtered material (127.36 g) was charged back into a 500 mL 4 neck round bottom with overhead mixing, 8 inch Vigreux column, short path condenser head with distillation collection flask, heating mantle, thermocouple, and nitrogen inlet purge. Succinic acid (112.79 g) and decanoic acid (159.24 g) were added to the reactor. The mixture was then heated to 205° C. stepwise along with varied nitrogen flow rate. The esterification reaction was finished when acidity was less than 2 mgKOH/g. The reactor was allowed to cool to 100° C. and then poured into a jar. The resulting transparent dark amber polyol had an OHV (hydroxyl value) of 19.0 mg KOH/g of sample, an acid value of 1.0 mg KOH/g of sample, and a viscosity at 25° C. of 1,895 cP (centipoise).

Example 7 Digestion/Reaction of Recycled Tan PET String

A 1000 mL 4 neck round bottom flask equipped with an overhead mixer, Allihn condenser column, short path condenser head with distillation collection flask, heating mantle, thermocouple, and nitrogen inlet was charged with recycled and cut tan colored PET string from RecycleAMP (81.19 g) and recycled propylene glycol (90.15 g). The mixture was heated with a stirring rate of 45 RPM and nitrogen flow at 0.2 SCFH to 200° C. After 30 minutes, the reaction temperature was about 100° C. and titanium (IV) butoxide catalyst (0.56 g) was added. After about 2 hours, the recycled PET string had completely dissolved into an opaque tan solution and appeared to be completely digested. The temperature was increased to 205° C. for about 3 hours to ensure complete PET digestion. After this, the reaction was then cooled to about 100° C. Dimer fatty acid (110.93 g) (Croda Pripol™ 1017) was added, while the mixing rate was increased to 350 rpm. When the addition was complete, the mixture was then heated to 200° C., and nitrogen was increased to 1.0 SCFH. The Allihn condenser was replaced with an 8-inch Vigreux column wrapped with aluminum foil. Water generated in the condensation reaction was collected in the distillation receiving flask. After 45 minutes the reaction temperature was increased to 205° C. for 1 hour. The acid number of the mixture was checked and found to be less than 2 mg KOH/g. The reactor was allowed to cool to 120° C. and then poured into 'M' glass fritted disc filter funnel with an approximate pore size of 10 to 16 microns. The material was vacuum filtered in an oven at 85° C. and the resulting polyol was opaque tan color. The material was then mixed with 2 wt % activated charcoal and filtered through 'F' glass fritted disc filter funnel with an approximate pore size of 4.0 to 5.5 microns. The filtered polyol appeared to lose it's opacity and was now red amber and transparent. The resulting polyol had an OHV (hydroxyl value) of 312.0 mg KOH/g, an acid value of 0.7 mg KOH/g, a Gardner color of 9, and a viscosity at 25° C. of 6000 cP (centipoise).

Example 8 Digestion of Densified Recycled White PET String

A 1000 mL 4 neck round bottom flask equipped with an overhead mixer, Allihn condenser column, heating mantle, thermocouple, and nitrogen inlet was charged with granules of recycled white PET string from RecycleAMP that has been agglomerated (378.61 g) and recycled propylene glycol (420.18 g). The mixture was heated with a stirring rate of 50 RPM and nitrogen flow at 0.2 SCFH to 200° C. After 30 minutes, the reaction temperature was about 130° C. and titanium (IV) butoxide catalyst (1.33 g) was added. After about 8 hours, the recycled PET string granules had completely dissolved into an opaque white solution and appeared to be fully digested. The reaction heat was turned off an allowed to cool to room temperature overnight. The next day, the reaction heating mantle was turned on and temperature was set to 200° C. After 3 hours the heating mantle was removed and the polyol was cooled to 120° C. The polyol was then poured out into a glass fritted disc filter funnel with a pore size of 10-16 microns. It was filtered in an oven at 120° C. with a vacuum pump set to 120 torr. The filtered polyol had a pale green appearance and was transparent. The resulting polyol had an OHV (hydroxyl value) of 727.5 mg KOH/g, an acid value of 1.5 mg KOH/g, a Gardner color of 2, and a viscosity at 25° C. of 710.2 cP (centipoise).

Example 9 Digestion of Densified Recycled Brown Sheared PET Carpet Fibers

A 1000 mL 4 neck round bottom flask equipped with an overhead mixer, Allihn condenser column, heating mantle, thermocouple, and nitrogen inlet was charged with loose granules of densified sheared carpet fibers from CLEAR Landfill (211.24 g) and recycled propylene glycol (234.45 g). The mixture was heated with a stirring rate of 150 RPM and nitrogen flow at 0.3 SCFH to 200° C. After 30 minutes, the reaction temperature was about 170° C. and titanium (IV) butoxide catalyst (0.71 g) was added. After about 4 hours, the recycled PET carpet granules had completely dissolved into an opaque brown solution and appeared to be fully digested. The reaction heat was turned off an allowed to cool to room temperature overnight. The next day, the reaction heating mantle was turned on and temperature was set to 120° C., with mixing at 275 RPM. Approximately 2 weight percent of powdered activated charcoal was added (9.48 g) and allowed to mix with the polyol for 2 hours. The polyol was then poured out into a 'F' glass fritted disc filter funnel with a pore size of 4.5-5 microns. It was filtered in an oven at 80° C. with a vacuum pump set to 130 torr. The filtered polyol had a dark brown appearance and was translucent. The resulting polyol had a hydroxyl value of 794.6 mg KOH/g, an acid value of 2.0 mg KOH/g, a Gardner color of greater than 18, and a viscosity at 25° C. of 653.3 cP (centipoise).

Example 10 Esterification of Example 9 with Soybean Oil

A 1000 mL 4 neck round bottom flask equipped with an overhead mixer, Vigreux column, short path distillation head with receiver flask, heating mantle, thermocouple, and nitrogen inlet was charged with the resulting polyol of Example 9 (300.00 g) and soybean oil from Sigma Aldrich (485.25 g). The mixture was heated with a stirring rate of 400 RPM and nitrogen flow at 1.0 SCFH to 185° C. After 1 hour and 45 minutes, the reaction temperature was set to 200° C. and the nitrogen flow rate was increased to 1.3 SCFH. After another hour, the temperature was increased to 210° C. and allowed to react for 3 and a half more hours before the heating mantle was turned off for the day. The next day, heat was turned on at 210° C., mixing at 375 RPM, and nitrogen 1.2 SCFH. After about 2 hours, the acid number was verified to be below 2.0 and the heat was shut off. The appearance of the polyol was brown and translucent. The resulting polyol had a hydroxyl value of 277.9 mg KOH/g, an acid value of 0.5 mg KOH/g, a Gardner color of 15, and a viscosity at 25° C. of 145.5 cP (centipoise).

Example 11 Rigid Foam Formulation with Example 10 Polyol

A 1 quart stainless steel mixing cup was charged with the resulting polyol of Example 10 (76.48 g), a flame retardant Fyrol™ PCF (8.70 g), a catalyst Dabco® K-15 (1.73 g), another catalyst Polycat® 5 (0.14 g), a surfactant Tegostab® B8465 (2.75 g), deionized water (0.35 g), and pentane (20.07 g) as the blowing agent. The cup was mixed with a 2-inch cowles blade at 1000 RPM for 30 s before adding PAPI™ 27 polymeric MDI (148.25 g) and was then mixed at 1700 RPM for 12 s. The contents of the metal cup were poured into a paper cup in the shape of a frustum cone with the smaller diameter on the bottom surface. The foam had a cream time of 50 seconds, a string time of 3 minutes 7 seconds, a rise time of 3 minutes 31 seconds, and a final tack free time of 4 minutes. The foam was allowed to cure overnight and the next morning the foam that extended beyond the top of the cup was cut off. The weight of the foam in the cup was measured and the density was approximated to 2.4 pounds per cubic foot (PCF).

Example 12 Digestion of 70% Densified Recycled Brown Sheared PET Carpet Fibers and 30% Polyurethane Flexible Foam A 1000 mL 4 neck round bottom flask equipped with an overhead mixer, Allihn condenser column, heating mantle, thermocouple, and nitrogen inlet was charged with loose granules of densified sheared carpet fibers from CLEAR Landfill (150.64 g) and recycled propylene glycol (178.80 g). The mixture was heated with a stirring rate of 150 RPM and nitrogen flow at 0.3 SCFH to 200° C. After 45 minutes, the reaction temperature was about 150° C. and titanium (IV) butoxide catalyst (0.70 g) was added. After about 2 hours, the recycled PET carpet granules had completely dissolved into an opaque dark brown solution. The reaction temperature was set to 190° C. and allowed to cool. Next, small pieces of black and white polyurethane flexible foam (38.51 g) were added to the reaction over 15 minutes. After the addition, the temperature was increased to 200° C. and reacted for another 5 hours. The heating mantle was removed and the polyol was cooled to 100° C. and poured into 1 L bottle. The polyol had a dark green-black appearance and was opaque. The resulting polyol had an OHV (hydroxyl value) of 733.7 mg KOH/g, an acid value of 2.3 mg KOH/and a viscosity at 25° C. of 2529 cP (centipoise).

Example 13 Digestion of 50% Densified Recycled Brown Sheared PET Carpet Fibers and 50% Polyurethane Flexible Foam A 1000 mL 4 neck round bottom flask equipped with an overhead mixer, Allihn condenser column, heating mantle, thermocouple, and nitrogen inlet was charged with loose granules of densified sheared carpet fibers from CLEAR Landfill (150.45 g) and recycled propylene glycol (178.99 g). The mixture was heated with a stirring rate of 150 RPM and nitrogen flow at 170° C. and titanium (IV) butoxide catalyst (0.70 g) was added. After about 2 hours, the recycled PET carpet granules had completely dissolved into an opaque dark brown solution. The reaction temperature was set to 190° C. and allowed to cool. Next, small pieces of black and white polyurethane flexible foam (164.67 g) were added to the reaction over 1 hour and 30 minutes. After the addition, the temperature was increased to 200° C. and reacted for another 4 hours. The heating mantle was removed and the polyol was cooled to 100° C. and poured into 1 L bottle. The polyol had a dark green-black appearance and was opaque. The resulting polyol had an OHV (hydroxyl value) of 553.9 mg KOH/g, an acid value of 1.9 mg KOH/and a viscosity at 25° C. of 8158 cP (centipoise).

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:
1. A process comprising:
   (a) densifying a PET or PTT fiber recycle stream into pellets or granules;
   (b) reacting the densified PET or PTT fiber recycle pellets or granules with a glycol in a reactor, thereby forming a completely digested product stream comprising a polyol product, and undigested contaminants;
(c) dispersing the undigested contaminants in the polyol product with a mixer having a high speed, high shear impeller with a tip speed of 40 to 120 feet per second;
(d) filtering the resulting polyol product, thereby forming a filtered polyol product, and a contaminant stream; and
(e) reacting the filtered polyol product in a reactor with a hydrophobe selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, thereby forming a polyester polyol.

2. The process of claim 1 wherein the fiber recycle stream is washed and dried to remove contaminants prior to densification.

3. The process of claim 1 wherein the fiber recycle stream is obtained by cutting the fiber from industrial rolls prior to densification.

4. The process of claim 1 wherein the fiber recycle stream is obtained by skiving the surface fibers away from post-industrial or post-consumer carpet prior to densification.

5. The process of 1 wherein the bulk density of the densified fiber recycle stream is 200 to 1,000 g/L.

6. The process of claim 1 wherein the polyol product has a viscosity at 80° C. of less than 20,000 cps.

7. The process of claim 1 further comprising reacting in step (e) the digested product stream with a modifier selected from $C_3$-$C_8$ dicarboxylic acids, their mono or dialkyl esters, mono or dialkenyl esters, or anhydrides.

8. The process of claim 1 wherein the PET fiber recycle stream results from a process step where raw PET yarn articles comprising yarn wound about a cardboard or paper roll are treated to separate the yarn from the roll.

9. A process comprising: (1) reacting
(a) PET bottle bale material;
(b) densified PET or PTT-based carpet fibers or mixtures thereof; and
(c) a glycol
in a reactor comprising a mixer, thereby forming a completely digested product stream comprising a polyol and undigested contaminants, wherein the mixer has a high speed, high shear impeller with a tip speed of 40 to 120 feet per second to disperse the contaminants in the polyol;
(2) filtering the resulting polyol, thereby forming a filtered polyol product and a contaminant stream; and
(3) reacting the filtered polyol product with a hydrophobe.

10. The process of claim 9 wherein the hydrophobe is selected from dimer fatty acids, trimer fatty acids, oleic acid, ricinoleic acid, tung oil, corn oil, canola oil, soybean oil, sunflower oil, bacterial oil, yeast oil, algae oil, castor oil, triglycerides or alkyl carboxylate esters having saturated or unsaturated $C_6$-$C_{36}$ fatty acid units, saturated or unsaturated $C_6$-$C_{36}$ fatty acids, alkoxylated castor oil, saturated or unsaturated $C_9$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or acids, or mixtures thereof, thereby forming a polyester polyol.

11. The process of 9 further comprising reacting the digested product stream with a $C_3$-$C_8$ dicarboxylic acid.

\* \* \* \* \*